United States Patent
Enoki et al.

(10) Patent No.: US 6,240,894 B1
(45) Date of Patent: Jun. 5, 2001

(54) CONTROL SYSTEM FOR CYLINDER INJECTION TYPE INTERNAL COMBUSTION ENGINE

(75) Inventors: Keiichi Enoki; Hirofumi Ohuchi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/359,778

(22) Filed: Jul. 26, 1999

(30) Foreign Application Priority Data

Feb. 5, 1999 (JP) .................................................. 11-028766

(51) Int. Cl.$^7$ ........................................................ F02D 43/04
(52) U.S. Cl. ........................... 123/295; 123/301; 123/305
(58) Field of Search .................................... 123/295, 299, 123/301, 305

(56) References Cited

U.S. PATENT DOCUMENTS 5,964,200 * 10/1999 Shimada et al. ..................... 123/305
5,967,113 * 10/1999 Kaneko et al. ...................... 123/295

FOREIGN PATENT DOCUMENTS 5-79337   3/1993 (JP).
8-312433 11/1996 (JP).

\* cited by examiner

*Primary Examiner*—Andrew M. Dolinar
(74) *Attorney, Agent, or Firm*—Sughrue, Mion, Zinn, Macpeak & Seas, PLLC

(57) ABSTRACT

A control system for a cylinder injection type internal combustion engine which can improve exhaust gas quality, fuel cost performance and combustion behavior of the engine. The system includes a means (13) for injecting fuel directly into cylinders, an ignition means (8, 9, 10, 11), a means (7) for regulating an intake air quality (Qa), a control means (12A, 12B) for controlling the fuel injection valves (13), the ignition means (8, 9, 10, 11) and the intake air flow regulating means (7) in dependence on the engine states. Additionally, using this control system, the fuel injection timing and ignition timing can be set accurately to values optimal for the currently validated combustion mode even in transient operation phases of the engine and regardless of variance in the mechanical structure of the intake system.

12 Claims, 24 Drawing Sheets

CONTROL SYSTEM FOR CYLINDER INJECTION TYPE INTERNAL COMBUSTION ENGINE

BACKGROUND OF THE INVENTION

1. Field of the Invention

The present invention generally relates to a control system for an internal combustion engine of cylinder injection type (also known as the direct fuel injection type engine) in which fuel is directly injected into engine cylinders to undergo combustion therein through spark ignition. More specifically, the invention is concerned with a control system for the cylinder injection type internal combustion engine which is capable of ensuring a significant reduction of harmful components contained in the exhaust gas of the engine with high efficiency while realizing improved combustion performance or drivability of the engine.

2. Description of Related Art

In general, with the spark ignition type internal combustion engine in which fuel is injected into an intake manifold for charging a uniform gas mixture into engine cylinders, a relatively high output power or torque can be generated. However, the internal combustion engine (hereinafter also referred to simply as the engine) of this type suffers a problem that the output torque thereof changes rather remarkably in dependence on the air-fuel ratio (hereinafter also referred to simply as the A/F ratio), providing thus difficulty in carrying out the control of output torque generated by the engine.

In the conventional intake manifold injection type engine (indirect fuel injection type engine) known heretofore, the air-fuel ratio can remain substantially constant, whereby the relation between an opening degree of a throttle valve and the output torque of the engine can be determined substantially definitely. For this reason, the combustion parameters such as the ignition timing and others have been determined or set definitely in dependence on the intake air flow rate (hereinafter also referred to as the intake air quantity).

By contrast, in the case of the cylinder injection type internal combustion engine, the output torque of the engine changes in dependence on the air-fuel ratio even for a same opening degree of the throttle valve. Accordingly, there arises the necessity of setting the combustion parameters such as the ignition timing and the fuel injection timing among others to optimal values in dependence on the engine load, the air-fuel ratio and others by controlling appropriately the throttle valve opening degree and the air-fuel ratio.

For having better understanding of the principle underlying the present invention, technical background thereof will be described below in some detail. FIG. 23 is a schematic diagram showing generally an arrangement of a conventional control system for a cylinder injection type internal combustion engine known heretofore. Referring to FIG. 23, an engine 1 constituting a major part of the internal combustion engine system is provided with an intake pipe 1a for introducing the intake air into the engine 1 and an exhaust pipe 1b for discharging the exhaust gas resulting from the combustion of the air-fuel mixture.

An air flow sensor 2 for detecting a flow rate or quantity Qa of the intake air flow fed to the engine 1 as indicated by an arrow is installed at an upstream location of the intake pipe 1a. Further installed within the intake pipe 1a is a throttle valve 3 for regulating or adjusting the intake air flow rate or quantity Qa, and a throttle position sensor 4 for detecting an opening degree θ of the throttle valve 3 is provided in association with the throttle valve 3.

Installed at a downstream location of the intake pipe 1a, i.e., at a location immediately preceding to the engine 1 is a surge tank 5. On the other hand, an air-fuel ratio sensor 6 which may be constituted by a linear type $O_2$-sensor is provided in the exhaust pipe 1b to serve for detecting an actual air-fuel (A/F) ratio F prevailing within the exhaust pipe 1b. Parenthetically, this air-fuel ratio may change within a range of e.g. 10 to 50.

A throttle valve actuator which serves as the intake air quantity regulating means 7 for adjusting or regulating the throttle valve opening degree θ is provided in association with the throttle valve 3. The throttle valve actuator 7 may be comprised of, for example, a stepping motor for operating rotatively the throttle valve 3 to thereby regulate the rate or quantity Qa of the intake air flowing through the intake pipe 1a.

Installed within each of the cylinders of the engine 1 is a spark plug 8 at which electric spark discharge takes place for igniting the air-fuel mixture within the combustion chamber of the cylinder. To this end, a distributor 9 is provided for supplying a high voltage distributively to the individual spark plugs 8 in synchronism with an ignition timing.

An ignition coil 10 realized in the form of a transformer having primary and secondary windings. The high voltage for ignition is generated across the secondary winding of the ignition coil 10 upon every interruption of the primary current flowing through the primary winding. The high voltage is then supplied to the distributor 9. Provided in association with the ignition coil 10 is an ignitor 11 which is constituted by a power transistor for interrupting the current flowing through the primary winding of the ignition coil 10 in conformance with the ignition timing for the individual engine cylinders.

The spark plug 8, the distributor 9, the ignition coil 10 and the ignitor 11 cooperate to constitute an ignition system for igniting the air-fuel mixture within the individual cylinders of the engine 1.

An ECU (Electronic Control Unit) 12 which is in charge of controlling the engine system as a whole includes a microcomputer for determining arithmetically control parameters for various actuators employed for the combustion control of the engine 1 on the basis of information detected by various sensors (i.e., information concerning the operation state of the engine 1) to thereby issue driving signals indicative of the control parameters to the relevant actuators.

As the control parameter signals, there may be mentioned an intake-air flow control signal A for the throttle valve actuator 7, an ignition signal G for the ignitor 11 (ignition system), a fuel injection signal J for the fuel injection valve (i.e., injector) 13, an EGR (Exhaust Gas Recirculation) control signal E for an EGR regulating valve 17 and a swirl control signal B for the swirl valve actuator (swirl rate regulating means) 19 among others.

The fuel injector 13 is mounted internally of each cylinder of the engine 1 for injecting the fuel directly into the combustion chamber defined within the cylinder. A crank angle sensor 14 for generating a crank angle signal CA is installed in association with a crank shaft which is driven rotatively by the engine 1.

For detecting a depression stroke α of an accelerator pedal manipulated by an operator or driver of a motor vehicle or the like equipped with the engine system now under consideration, an accelerator pedal stroke sensor 15 is provided in association with the accelerator pedal (not shown).

The crank angle signal CA and the accelerator pedal depression stroke signal α are inputted to the ECU 12 similarly to the other sensor signals.

As additional sensors, there are provided an intake pressure sensor for detecting the intake air pressure within the intake pipe of the engine 1, an intake-air temperature sensor for detecting the temperature of the intake air and a cooling water temperature sensor for detecting the temperature of the cooling water of the engine among others, although they are not shown in the figure. Parenthetically, the intake pressure sensor also functions as an atmospheric pressure sensor when the engine 1 is stopped.

Additionally, an ISC actuator for controlling the opening degree of an ISC (Idle Speed Control) valve provided in association with a bypass passage of the intake pipe 1a is provided as another actuator (not shown) for the combustion control of the engine 1.

The crank angle sensor 14 outputs a pulse signal corresponding to the engine rotation number (engine speed (rpm)) as the crank angle signal CA so as to serve also as a rotation sensor (engine speed sensor), as well known in the art. Further, the crank angle signal CA contains pulses having edges corresponding to reference crank angles of the plural cylinders, respectively, of the engine wherein each of the reference crank angles is employed for arithmetically determining the control timing for the engine 1.

An exhaust gas recirculation passage (hereinafter referred to as the EGR passage) 16 is provided between the exhaust pipe 1b and the surge tank 5 for recirculating a part of the exhaust gas into the intake pipe 1a, wherein a stepping-motor-driven type EGR regulating valve 17 (EGR regulating means) is provided in association with the EGR passage 16 for regulating the amount or quantity of the exhaust gas recirculated to the intake pipe. This quantity will hereinafter be referred to also as the EGR quantity.

Further, disposed downstream of the surge tank 5 is an intake port which is divided into two sections for each of the engine cylinders, wherein a swirl control valve 18 is provided in one of the intake port sections for controlling the generation of swirls of the air-fuel mixture within the engine cylinder.

More specifically, the swirl control valve 18 is operated by a stepping-motor type actuator 19 to be regulated in respect to the angular position (i.e., opening degree) so that the swirl rate within the engine cylinder can be controlled.

The swirl control valve 18 and the actuator 19 cooperate to constitute the swirl rate regulating means for regulating the swirl rate within the cylinder.

An onboard battery 20 supplies electric power to the ECU 12 by way of an ignition switch 21.

FIG. 24 is a block diagram showing an exemplary configuration of the ECU 12 mentioned previously by reference to FIG. 23. Referring to FIG. 24, the ECU 12 includes a microcomputer 100, a first input interface circuit 101, a second input interface circuit 102, an output interface circuit 104 and a power supply circuit 105.

The first input interface circuit 101 shapes the crank angle signal CA to thereby generate an interrupt signal, which is then inputted to the microcomputer 100.

On the other hand, the second input interface circuit 102 is designed as to fetch the other sensor signals (e.g. signals indicative of the intake air quantity Qa, throttle valve opening degree θ, an air-fuel ratio F, the accelerator pedal depression stroke α, etc.) as the input signals to the microcomputer 100.

The output interface circuit 104 is designed to amplify the various actuator driving signals (e.g. the intake-air flow control signal A, the ignition signal G, the fuel injection signal J, etc.) to output the amplified signals to the throttle valve actuator 7, the ignitor 11, the fuel injector 13, etc., respectively.

The microcomputer 100 is comprised of a CPU (Central Processing Unit) 200, a counter 201, a timer 202, an A/D (analogue-to-digital) converter 203, a random access memory (hereinafter referred to as the RAM in abbreviation) 205, a read-only memory (hereinafter referred to as the ROM in abbreviation) 206, an output port 207 and a common bus 208.

The CPU 200 serves to arithmetically determine the control quantities for the throttle valve actuator 7 and the fuel injector 13 in dependence on the engine operation state (e.g. the accelerator pedal depression stroke α and the crank angle signal CA) in accordance with a predetermined program.

The free-running counter 201 is designed to measure a rotation period of the engine 1 on the basis of the crank angle signal CA, while the timer 202 is employed for measuring or determining various control time points or timing and time durations or periods.

The A/D converter 203 converts the analogue input signals from the various sensors to digital signals which are then inputted to the CPU 200.

The RAM 205 is used as a work memory for the CPU 200 while the ROM 206 is used for storing therein various operation programs to be executed by the CPU 200.

Various control signals (e.g. the fuel injection signal J, the ignition signal G, etc.) are outputted through the output port 207. The aforementioned individual components 201, 202, 203, 205, 206 and 207 incorporated in the microcomputer 100 are connected to the CPU 200 by way of the common bus 208.

Next, description will be directed to the operation of the conventional control system for the cylinder injection type internal combustion engine of the structure described above by reference to FIGS. 23 and 24.

In the course of controlling the operation of the engine 1, the signals indicative of the engine operation state (i.e., sensor signals) are inputted to the ECU 12 from the various types of the sensors mentioned previously.

When the crank angle signal CA is inputted to the ECU 12A, an interrupt signal is issued through the first input interface circuit 101 in response to a pulse edge of the crank angle signal CA.

In response to the interrupt signal, the CPU 200 reads the output content or value of the counter 201 to thereby determine arithmetically the rotation period of the engine 1 on the basis of a difference between a current counter value and a preceding one, the rotation period as determined being then stored in the RAM 205. Further, the CPU 200 arithmetically determines the engine rotation number or engine speed Ne (rpm) on the basis of the rotation period and the measured time or period corresponding to a predetermined crank angle which can be derived from the crank angle signal CA.

On the other hand, through the second input interface circuit 102, the analogue sensor signals such as the signal indicative of the accelerator pedal depression stroke α and others are fetched to be supplied to the CPU 200 after having been converted to the corresponding digital signals by the A/D converter 203.

A control parameter arithmetic means realized by the CPU 200 arithmetically determines various control parameters on the basis of the sensor information indicative of the engine operation states to thereby output driving signals corresponding to the control parameters to the relevant actuators mentioned previously by way of the output port 207 and the output interface circuit 104.

By way of example, the CPU 200 incorporated in the ECU 12 arithmetically determines a desired opening degree of the throttle valve (hereinafter referred to as the desired throttle valve opening degree) on the basis of the accelerator pedal depression stroke α to output the intake-air flow control signal A corresponding to the desired throttle valve opening degree. In response to this signal A, the throttle valve actuator 7 is so driven that the actual throttle valve opening degree detected by the throttle position sensor 4 coincides with the above-mentioned desired throttle valve opening degree.

Further, the CPU 200 arithmetically determines a desired fuel injection quantity to output the fuel injection signal J corresponding to the desired fuel injection quantity. In response thereto, the fuel injector 13 is actuated for a pulse duration or width which allows the actual fuel injection quantity (determined by the duration of actuation of the fuel injector 13) to coincide with the desired fuel injection quantity and at a predetermined timing based on the crank angle signal CA to inject the fuel directly into the associated cylinder of the engine 1.

Besides, the CPU 200 arithmetically determines a desired ignition timing to output the ignition signal G indicative of the desired ignition timing for thereby driving the ignitor 11 at a predetermined timing in synchronism with a fuel injection timing.

Consequently, the primary current of the ignition coil 10 is interrupted in synchronism with the ignition signal G, whereby the high voltage induced in the secondary winding of the ignition coil 10 is applied to the spark plug 8 through the distributor 9. Thus, electric discharge occurs at the spark plug 8 at a predetermined ignition timing to generate the spark for ignition.

In this manner, by injecting the predetermined amount or quantity of fuel into each cylinder of the engine 1 and by igniting the mixture gas containing the fuel as injected at the predetermined ignition timing, optimal operation of the engine 1 can realized.

In general, the CPU 200 is so designed as to arithmetically determine a desired mean effective pressure which is in proportion to the torque for thereby setting the parameters for combustion or combustion parameters such as the air-fuel ratio, fuel injection timing (fuel injection end timing) and the ignition timing. For more particulars in this respect, reference should be made to Japanese Unexamined Patent Application Publication No. 312433/19996 (JP-A-8-312433).

In other words, the control parameters are arithmetically determined on the basis of the desired mean effective pressure derived as the presumed engine load information. In this conjunction, it is however noted that a time lag will unavoidably be involved in the aforementioned arithmetic determination of the desired mean effective pressure. In that case, the presumed engine load does not coincide with the actual engine load. Consequently, an error is involved in the engine control, which in turn incurs a possibility of degradation of the fuel cost performance and increase of harmful components contained in the engine exhaust gas.

Especially in the transient operation phase of the engine such as accelerating or decelerating operation, the actual quantity Qa of the intake air charged into the cylinder will deviate from the intake air quantity commanded by the accelerator pedal depression stroke α due to a lag involved in the operation of the throttle valve 3 which is controlled electronically by the throttle valve actuator 7 and/or lag involved in increasing or decreasing the flow rate of the air charged into the intake pipe 1a,whereby the control parameters for the combustion mentioned above deviate from the optimum values, giving rise to a problem that the exhaust gas quality and the fuel cost performance of the engine change for the worse.

Besides, due to the manufactual dispersion or variance in the mechanical structure of the intake system (inclusive of the intake pipe 1a) of the engine 1, the intake air quantity may vary even in the steady or cruising operation thereof. Consequently, the control parameters for combustion mentioned above may deviate from the optimum values, unlike the case where the actual intake air quantity coincides with the one commanded by the acceleration pedal depression stroke signal α.

Furthermore, in the case of the conventional system disclosed in the above-mentioned patent application publication (JP-A-8-312433), the combustion mode of the engine 1 is determined on the basis of the engine rotation number or engine speed (rpm) Ne and the desired mean effective pressure, whereon the control parameters conforming to the determined combustion mode are arithmetically determined.

More specifically, as the combustion modes which are changed over to one another in dependence on the operation state of the engine, there may be mentioned a stratified lean combustion mode for realizing a lean combustion (lean burn) by producing a stratified mixture gas by injecting the fuel during the combustion stroke of the engine, a uniform lean combustion mode for realizing a lean combustion by producing a uniform mixture gas by injecting the fuel during the suction stroke, a stoichiometric combustion mode realized by performing a stoichiometric feedback control, and an open loop mode in which the engine is operated with an air-fuel ratio smaller than the stoichiometric air-fuel ratio.

To this end it is noted that because of the lag involved in the arithmetic determination of the desired mean effective pressure, deviation of the control from the optimal may sometimes occur in the combustion modes mentioned above.

Especially in the lean combustion mode (or lean burn mode), operation of the engine will become unstable when the engine 1 is in the cold state with the temperate of the mcooling water being lower than a predetermined temperature or when the temperature of the intake air is extremely low, as encountered in driving the motor vehicle in a cold district, or when the atmospheric pressure is low, as encountered in driving the vehicle in a highland area (i.e., when the conditions for the combustion are poor), because the lean combustion or burn behavior becomes degraded in these cases.

Furthermore, at the time of changeover of the combustion modes, it is impossible to control the fuel injection timing (fuel injection end timing) and the ignition timing such that change in the torque loss brought about by the pumping loss, cooling loss or by other causes upon changeover of the combustion mode can be coped with. Thus, there may arise a possibility of occurrence of torque shock.

In this conjunction, it is additionally noted that attempt for preventing such torque shock will incur much complexity in the combustion mode changeover control procedure executed by the ECU 12.

Additionally, in the conventional system disclosed in the patent application publication (JP-A-8-312433) mentioned previously, control of the opening degree of the EGR regulating valve is performed on the basis of the aforementioned desired mean effective pressure as well. Consequently, lag due to the arithmetic operation involved in determining the desired mean effective pressure can not be avoided. Besides, the arithmetic operation itself is intrinsically very complex.

More specifically, because of occurrence of the lag in the arithmetic operation for determining the desired mean effective pressure, difficulty is encountered in controlling the EGR quantity conformably to the engine load. Additionally, the EGR quantity may deviate from the optimum value due to manufactural dispersion or tolerance of the throttle valve and change of the environmental conditions.

A method of controlling the swirl control valve 18 and the swirl valve actuator 19 is described, for example, in Japanese Unexamined Patent Application Publication No. 79337/1993 (JP-A-5-79337). According to the teachings disclosed in this publication, the CPU 200 is so programmed as to partition the engine load range into three regions as a function solely of the accelerator pedal depression stroke α, wherein the opening degree of the swirl control valve (i.e., angular position of the swirl control valve 18) is selectively set to a value in one of the three regions in dependence on the engine load.

Nevertheless, the optimum swirl rate conforming to the air-fuel ratio and the engine load can not always be realized, giving rise to the problem that the combustion mode may change for the worse.

As will now be appreciated from the foregoing description, the conventional control system for the cylinder injection type internal combustion engine suffers a problem that error or deviation in the control can not be avoided due to a lag involved in the arithmetic operation for determining the desired mean effective pressure particularly in the transient engine operation phases, incurring degradation in the quality of the exhaust gas as well as the fuel cost performance, because the various control parameters such as the desired air-fuel ratio, the desired fuel injection timing and the desired ignition timing are determined on the basis of the desired mean effective pressure.

Furthermore, even in the cruising or steady operation phase of the engine, the control parameters may depart from the respective optimum values because of the manufactural dispersion in the mechanical structure of the intake system, which leads to a problem that difficulty is encountered in realizing the optimal combustion state.

Additionally, in the conventional control system for the cylinder injection type engine, the combustion mode of the engine is determined on the basis of the desired mean effective pressure and then the control parameters are arithmetically determined so as to conform with the combustion mode as determined. Thus, when the environmental conditions for the engine operation become worse in the lean combustion mode among others, the combustibility or combustion behavior in the lean combustion mode will be degraded because of the lag involved in the arithmetic operation for determining the desired mean effective pressure, which in turn brings about instability of the engine operation, presenting another problem.

Furthermore, in the conventional control system, it is difficult or impossible to control the fuel injection timing (fuel injection end timing) and the ignition timing at the time of changeover of the combustion modes such that change in the torque loss brought about by the pumping loss, cooling loss or by other causes upon changeover of the combustion mode can be compensated for. Thus, there may arise a possibility of occurrence of torque shock. Further, attempt for preventing such torque shock will incur much complexity in the combustion mode changeover control procedure.

Additionally, in the case of the conventional system, control of the opening degree of the EGR regulating valve is also performed on the basis of the desired mean effective pressure. Consequently, the control can not evade a lag brought about by the arithmetic operation for determining the desired mean effective pressure. Besides, the very arithmetic operation for determining the EGR valve opening degree becomes very complex, to another disadvantage.

Moreover, due to occurrence of the lag in the arithmetic operation for determining the desired mean effective pressure, difficulty is encountered in controlling the EGR quantity so as to conform with the engine load. Additionally, the EGR quantity may deviate from the optimum value due to manufactural dispersion or tolerance of the throttle valve and change of the environmental conditions. Thus, there arises a problem that $NO_x$ contained in the exhaust gas can not be removed satisfactorily, incurring degradation of the exhaust gas quality.

Further, in the conventional control system for the cylinder injection type internal combustion engine, the swirl rate (i.e., angular position of the swirl control valve 18) is controlled on the basis of the partitioned engine load regions in dependence on the accelerator pedal depression stroke α. With such arrangement, the optimum swirl rate can not always be realized, although it depends on the air-fuel ratio and the engine load state, which also leads to the problem that the optimal combustion state can not be realized.

SUMMARY OF THE INVENTION

In the light of the state of the art described above, it is an object of the present invention to provide a control system for a cylinder injection type internal combustion engine, which system is capable of ensuring effective suppression or reduction of harmful components contained in the exhaust gas) and improvement of the combustion state (combustibility or combustion performance).

In view of the above and other objects which will become apparent as the description proceeds, the present invention is directed to a control system for an internal combustion engine of a cylinder injection type, which system includes fuel injection valves for injecting fuel directly into cylinders, respectively, of the internal combustion engine, an ignition means for igniting fuel within the cylinders, respectively, an intake air flow regulating means for regulating the quantity of intake air fed to the internal combustion engine, sensors of various types for detecting operation states of the internal combustion engine, and a control means for controlling the fuel injection valves, the ignition means and the intake air flow regulating means in dependence on the engine operation states, wherein the various types of sensors are designed to detect at least an engine rotation number (rpm), an accelerator pedal depression stroke and an intake air quantity, respectively.

In the control system for the cylinder injection type internal combustion engine mentioned above, it is proposed according to a general aspect of the present invention that the control means is comprised of a combustion mode determining means for determining a plurality of combustion modes in dependence on the engine rotation number (rpm) and the accelerator pedal depression stroke, a desired air-fuel ratio setting means for setting a desired air-fuel ratio in conformance with the combustion mode on the basis of the engine rotation number and the accelerator pedal depression stroke, a desired fuel injection quantity arithmetic means for arithmetically determining a desired fuel injection quantity conforming to the desired air-fuel ratio, and a control parameter arithmetic means for arithmetically determining control parameters for the fuel injection valves and the ignition means in conformance with the combustion mode on the basis of the engine rotation number and at least one of the accelerator pedal depression stroke, the intake air quantity and the desired fuel injection quantity.

With the arrangement of the control system for cylinder injection type engine described above, the control parameters such as the fuel injection timing and/or the ignition timing can be set accurately to the respective optimum values even in the transient operation phase of the engine regardless of variances in the mechanical structure of the intake system of the engine. Thus, the quality of the exhaust gas, the fuel cost performance and the combustion behavior can be improved significantly to an advantageous effect.

In a preferred mode for carrying out the present invention, the control parameter arithmetic means may be so designed as to arithmetically determine as a control parameter for the fuel injection valve a fuel injection end timing for terminating operation of the fuel injection valve.

In another preferred mode for carrying out the present invention, the desired air-fuel ratio setting means may be so arranged as to include a filter means for performing a filter processing on the desired air-fuel ratio so that the desired air-fuel ratio can follow change behavior of the intake air quantity.

In yet another preferred mode for carrying out the invention, the various types of sensors may include sensors for detecting a cooling water temperature, an atmospheric pressure and an intake air temperature, respectively, of the engine, while the combustion mode determining means may be so designed as to determine the combustion mode on the basis of at least one of the cooling water temperature, the atmospheric pressure and the intake air temperature in addition to the engine rotation number and the accelerator pedal depression stroke.

In still another preferred mode for carrying out the invention, the combustion mode determining means may be so designed as to set the combustion mode to a stoichiometric feedback combustion mode or alternatively to an open loop mode in response to at least one of events that the cooling water temperature indicates a cold state of the engine, the atmospheric pressure indicates an ambiance in a highland area and that the intake air temperature indicates driving in a cold district.

With the arrangements described above, the control system for the cylinder injection type internal combustion engine is capable of ensuring more effectively suppression of harmful components contained in the exhaust gas and improvement of the combustion state or combustion behavior.

In a further preferred mode for carrying out the present invention, the control means may be so designed as to delay changeover control of the control parameters for at least one of the fuel injection valve and the ignition means until the air-fuel ratio of the engine has reached a predetermined air-fuel ratio upon changeover of the combustion mode.

In a yet further preferred mode for carrying out the invention, the desired air-fuel ratio setting means may include a filter means for performing a filter processing on the desired air-fuel ratio so that the desired air-fuel ratio can follow change behavior of the intake air quantity, while the control means may be so designed as to employ as the air-fuel ratio a desired air-fuel ratio which has undergone the filtering processing through the filter means constituting a part of the desired air-fuel ratio setting means.

By virtue of the arrangements described above, suppression of the torque shock which may otherwise occur upon changeover of the combustion mode can be realized effectively and satisfactorily without incurring any appreciable degradation in the exhaust gas quality.

In a still further preferred mode for carrying out the invention, the various types of sensors may include a sensor for detecting an air-fuel ratio within an exhaust pipe of the internal combustion engine, and the control means may be so designed as to employ as the air-fuel ratio for the engine the air-fuel ratio within the exhaust pipe.

With the above arrangement, suppression of the torque shock which may otherwise occur upon changeover of the combustion mode can be realized effectively without resorting to the air-fuel ratio filter and without incurring degradation in the exhaust gas quality.

In another preferred mode for carrying out the invention, the control system for a cylinder injection type internal combustion engine may further include an exhaust gas recirculation regulating means for regulating an exhaust gas recirculation quantity representative of a part of exhaust gas of the engine which is recirculated. In that case, the control parameter arithmetic means of the control means may be so designed as to determine arithmetically a control parameter for the exhaust gas recirculation regulating means in conformance with the combustion mode on the basis of the engine rotation number and at least one of the accelerator pedal depression stroke, the intake air quantity and the desired fuel injection quantity, to thereby control the exhaust gas recirculation quantity.

With the arrangement described above, the control processing procedure can be much simplified while optimum EGR quantity control can be carried out in conformance with the actual engine load state with high response. Thus, reduction of the harmful components contained in the exhaust gas as well as improvement of the combustion behavior can be accomplished more effectively and satisfactorily.

In yet another preferred mode for carrying out the invention, the control system for a cylinder injection type internal combustion engine may further include swirl valves for generating swirls within the cylinders, respectively, and a swirl rate regulating means for driving the swirl valves to thereby regulate swirl rate within the cylinder. In that case, the control parameter arithmetic means can be so designed as to determine arithmetically a control parameter for the swirl rate regulating means in conformance with the combustion mode on the basis of the engine rotation number and at least one of the accelerator pedal depression stroke, the intake air quantity and the desired fuel injection quantity, for thereby controlling the swirl rate.

With the arrangement of the control system described above, the swirl rate can be controlled optimally and accurately for the actual engine load state, which can thus contribute to further improvement of the exhaust gas quality and the combustion behavior of the engine.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
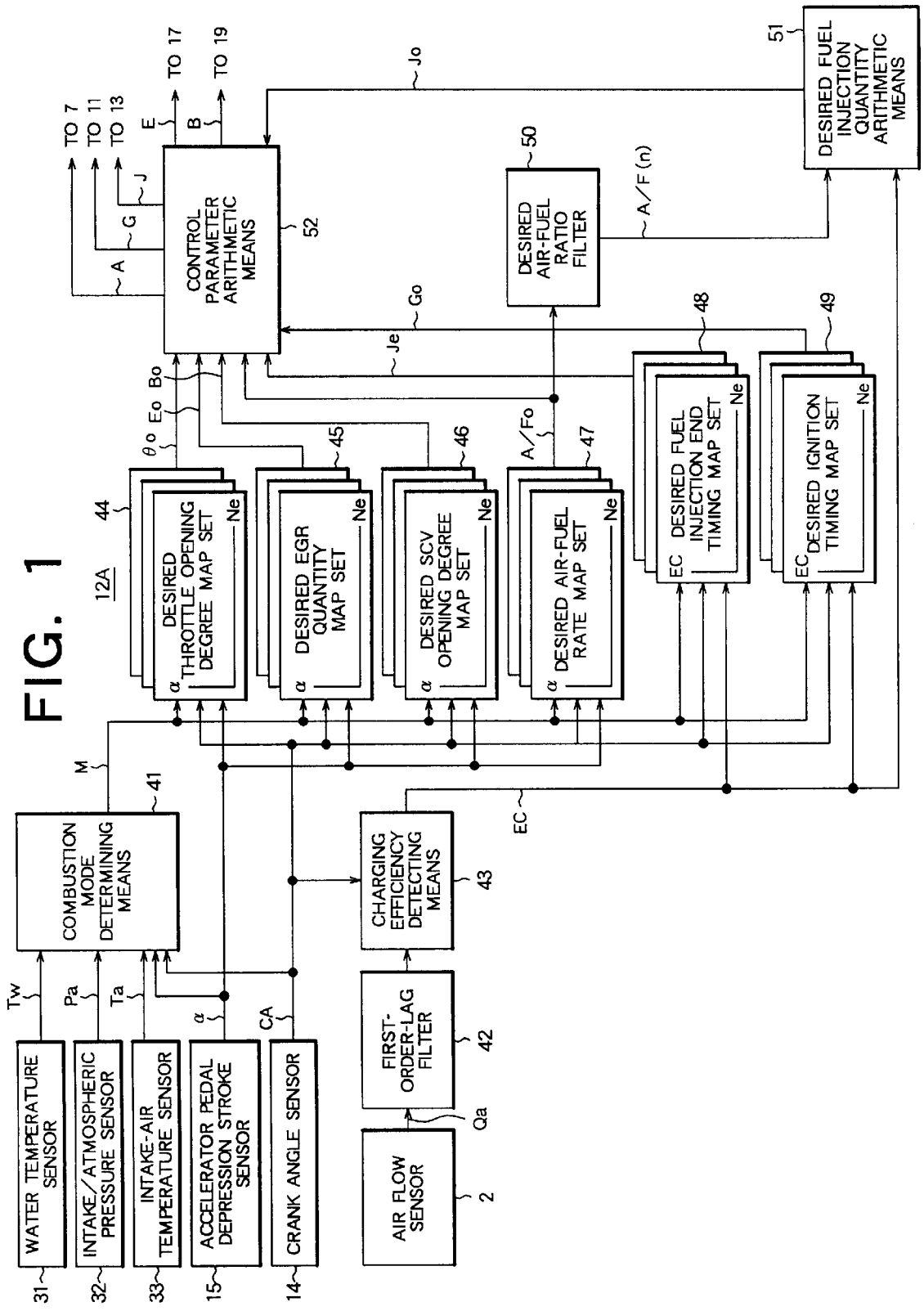
FIG. 1 is a functional block diagram showing a general arrangement of an electronic control unit which serves as a control means of a control system for a cylinder injection type internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a functional block diagram showing a general arrangement of an electronic control unit (hereinafter referred to simply as the ECU) 12A which serves as a control means of a control system for a cylinder injection type internal combustion engine according to a first embodiment of the present invention. In the figure, like parts or components as those described hereinbefore by reference to FIG. 23 are denoted by like reference symbols, and repeated description thereof is omitted.

Figure 23:
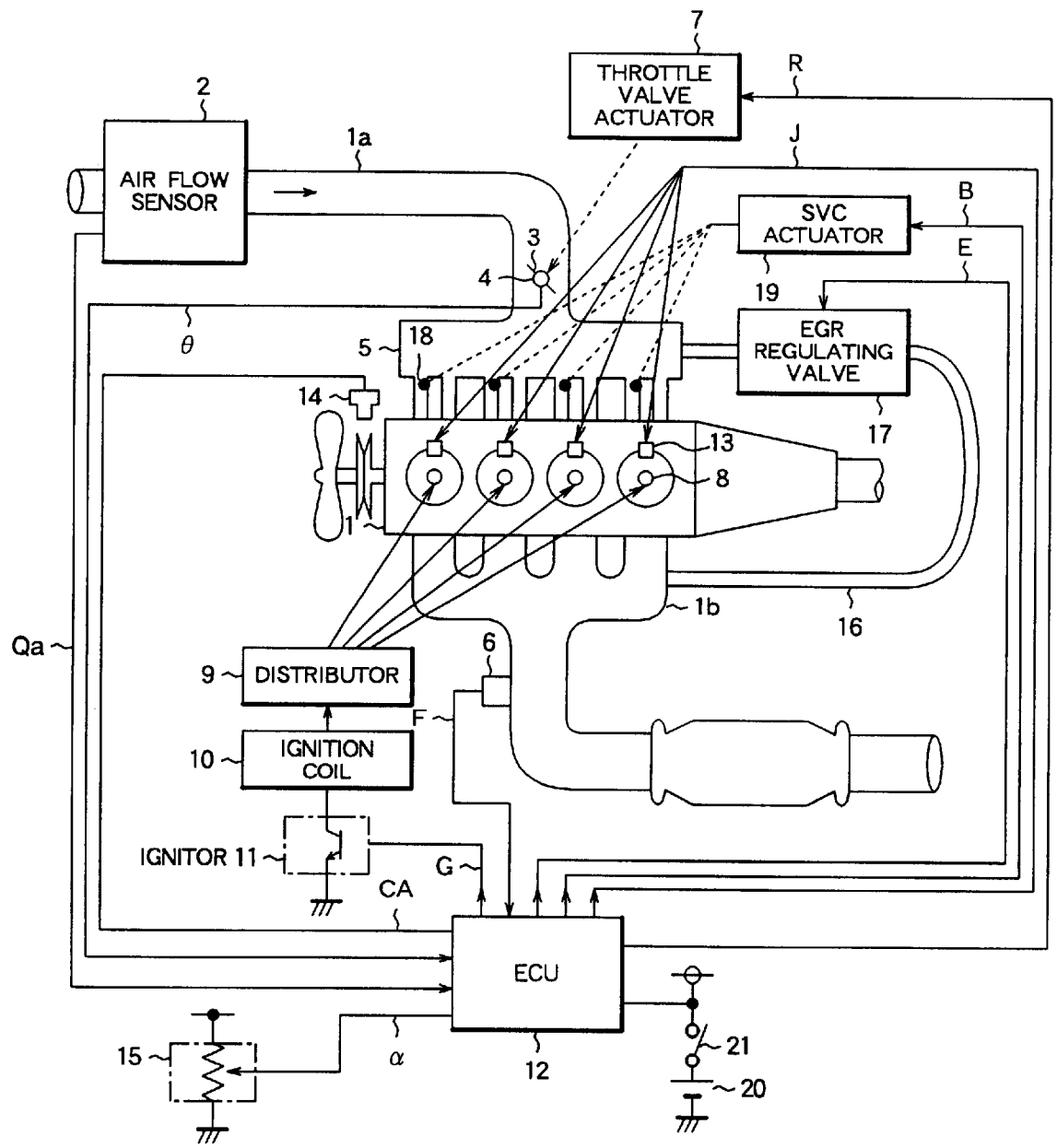
FIG. 23 is a schematic diagram showing generally an arrangement of a conventional control system for a cylinder injection type internal combustion engine.

Further, structural features or components which are omitted from the illustration in FIG. 1 are substantially same as those shown in FIG. 23.

Figure 24:
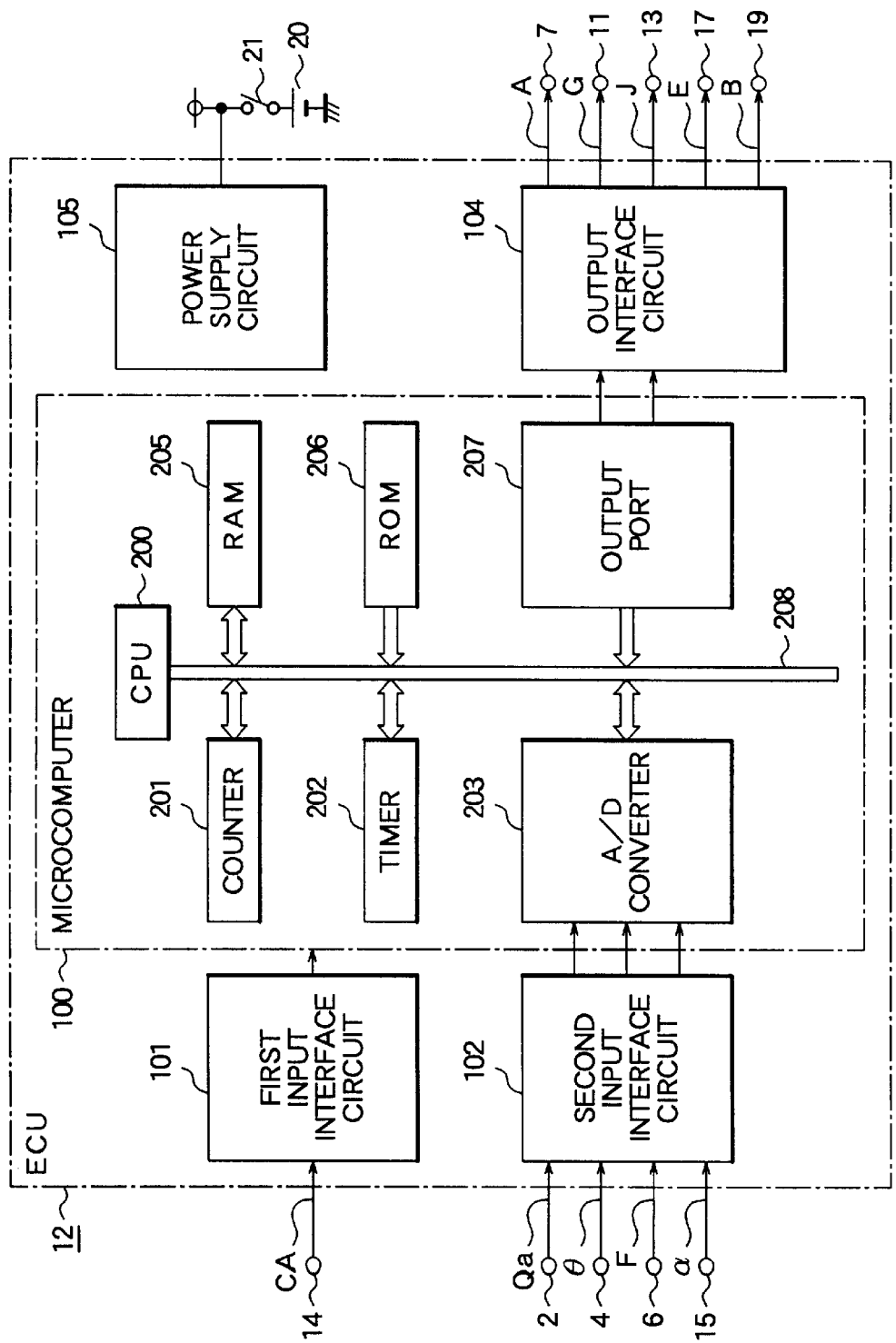
FIG. 24 is a block diagram showing an exemplary configuration of an electronic control unit incorporated in the conventional control system for the cylinder injection type engine.

Additionally, it should be mentioned that the structure of the ECU 12A in general is also substantially same as that described hereinbefore by reference to FIG. 24 except for partial difference of control programs executed by the CPU 200.

According to the teachings of the present invention incarnated in the first embodiment thereof, there are additionally provided a water temperature sensor 31 for detecting the cooling water temperature Tw, an atmospheric pressure sensor 32 for detecting the atmospheric pressure Pa, and an intake-air temperature sensor 33 for detecting a temperature of the intake air as the members belonging to a group or set of the various types of sensors mentioned hereinbefore in conjunction with the conventional control system.

In the figure, however, the throttle position sensor 4 and the air-fuel ratio sensor 6 are omitted from illustration for simplification.

The ECU 12A is comprised of a combustion mode determining means 41, a first-order-lag filter (filter with a first-order lag) 42, a charging efficiency detecting means 43, a set of desired throttle opening degree maps 44, a set of desired EGR (exhaust gas recirculation) maps 45, a set of desired swirl rate maps 46, a set of desired air-fuel ratio maps 47, a set of desired fuel injection end timing maps 48, a set of desired ignition timing maps 49, a desired air-fuel ratio filter 50, a desired fuel injection quantity arithmetic means 51 and a control parameter arithmetic means 52.

Incidentally, in FIG. 1, the data map sets 44 to 49 are shown separately from the control parameter arithmetic means 52. However, this is only for convenience of illustration. In practical applications, the former are incorporated in the latter. At this juncture, it should also be mentioned that the desired air-fuel ratio map set 47 and the desired air-fuel ratio filter 50 are so combined as to constitute a desired air-fuel ratio setting means.

The combustion mode determining means 41 is generally so designed as to determine selectively a plurality of combustion modes M (indicated by flag values) in dependence on the cooling water temperature Tw, the intake air temperature Ta, the crank angle signal CA or engine rotation number (rpm) Ne and the accelerator pedal depression stroke $\alpha$.

More specifically, the combustion mode determining means 41 determines the combustion mode M primarily in dependence on the engine rotation number Ne and the accelerator pedal depression stroke $\alpha$ while correcting the determined combustion mode M when the cooling water temperature Tw, the atmospheric pressure Pa and the intake air temperature Ta indicate that the conditions for combustion have changed for the worse.

In more concrete, the combustion mode determining means 41 sets the combustion mode M to the stoichiometric feedback combustion mode or alternatively the open loop mode exclusively of the lean combustion mode in response to at least one of the events that the cooling water temperature Tw indicates the cold state of the engine 1 (i.e., the cooling water temperature Tw is lower than a predetermined cooling water temperature Twr), the atmospheric pressure Pa indicates that the vehicle equipped with the engine concerned is driving in, for example, a highland area (i.e., the atmospheric pressure Pa is lower than a predetermined atmospheric pressure Par), and that the intake air temperature Ta indicates a cold district (i.e., the intake air temperature Ta is lower than a predetermined intake air temperature Tar).

The first-order-lag filter 42 performs a first-order-lag filter processing on the intake air quantity Qa detected by the air flow sensor 2. On the other hand, the charging efficiency detecting means 43 is so designed as to detect as the charging efficiency EC the amount or quantity of the intake air actually charged in the engine cylinder on the basis of the intake air quantity Qa resulting from the first-order-lag filter processing and the crank angle signal CA (i.e., engine rotation number Ne).

The individual data map sets 44 to 49 which are selectively referenced for determining arithmetically various control parameters are prepared previously each as a set including a same number of maps as that of the combustion modes M, wherein in each set, the data map corresponding or conforming to the combustion mode M is selected.

In each data map of the map sets 44 to 47, the engine rotation number Ne is taken along the abscissa with the accelerator pedal depression stroke $\alpha$ being taken along the ordinate, wherein two-dimensional map data are extracted from the map which corresponds to currently valid combustion mode M on the basis of the engine rotation number Ne and the accelerator pedal depression stroke $\alpha$.

On the other hand, in each of the other data maps of the map sets 48 and 49, the engine rotation number Ne is taken along the abscissa while the charging efficiency EC (equivalent to the intake air quantity Qa) is taken along the ordinate, wherein two-dimensional map data are extracted from the map which corresponds to the currently valid combustion mode M on the basis of the engine rotation number Ne and the charging efficiency EC.

More specifically, the desired throttle valve opening degree $\theta o$ is determined by referencing the desired throttle opening degree map 44 as selected, the desired EGR valve opening degree Eo is determined by referencing the desired EGR map 45 as selected, the desired opening degree Bo of the swirl control valve (hereinafter referred to as the SCV) is determined by referencing the desired swirl rate map 46 as selected, the desired air-fuel ratio A/Fo is determined by referencing the desired air-fuel ratio map 47 as selected, the desired fuel injection end timing Je is determined by referencing the desired fuel injection end timing map 48 as selected, and the desired ignition timing Go is determined by referencing the desired ignition timing map 49 as selected.

Among the desired control parameters mentioned above, the desired air-fuel ratio A/Fo as determined on the basis of the relevant data map is inputted to the desired fuel injection quantity arithmetic means 51 by way of the desired air-fuel ratio filter 50.

The desired air-fuel ratio filter 50 is so designed as to perform the filter processing on the desired air-fuel ratio A/Fo determined from the map such that the desired air-fuel ratio A/Fo can follow change behavior of the intake air quantity Qa which is brought about when the accelerator pedal depression stroke $\alpha$ is changed.

The desired fuel injection quantity arithmetic means 51 arithmetically determines the desired fuel injection quantity Jo (equivalent to the desired fuel injection time duration) on the basis of the desired air-fuel ratio A/F(n) outputted from the desired air-fuel ratio filter 50 and the charging efficiency EC (equivalent to the intake air quantity Qa). Hereinafter, the air-fuel ratio outputted from the filter 50 will be referred to as the desired filtering-undergone air fuel ratio only for convenience of the description.

The desired fuel injection quantity Jo is inputted to the control parameter arithmetic means 52 together with the data extracted from the individual map sets 44 to 49.

The control parameter arithmetic means 52 is so designed as to generate on the basis of the engine operation state and the individual data corresponding or conforming to the engine operation state an intake-air flow control signal A for the throttle valve actuator 7, an ignition signal G for the ignitor 11, a fuel injection signal J for the fuel injector 13, an EGR control signal E for an EGR (exhaust gas recirculation) regulating valve 17 and the swirl control signal B for a swirl control valve actuator 19.

Further, the control parameter arithmetic means 52 determines arithmetically the combustion control parameters (the fuel injection signal J, the ignition signal G, etc.) conforming to the currently valid combustion mode M on the basis of the engine rotation number Ne and at least one of the accelerator pedal depression stroke $\alpha$, the charging efficiency EC (equivalent to the intake air quantity Qa) and the desired fuel injection quantity Jo.

In that case, the control parameter arithmetic means 52 determines arithmetically the time point or timing for terminating or ending the operation of the fuel injector 13 on the basis of the desired fuel injection end timing Je to issue the corresponding fuel injection signal J to the fuel injector 13.

Besides, the control parameter arithmetic means 52 generates the EGR control signal E conforming to the valid combustion mode M on the basis of the engine rotation number Ne and at least one of the accelerator pedal depression stroke $\alpha$, the charging efficiency EC and the desired fuel injection quantity Jo, for thereby controlling the EGR quantity.

Additionally, the control parameter arithmetic means 52 generates the swirl control signal B conforming to the currently valid combustion mode M on the basis of the engine rotation number Ne and at least one of the accelerator pedal depression stroke $\alpha$, the charging efficiency EC and the desired fuel injection quantity Jo, to thereby control the swirl rate.

Figure 9:
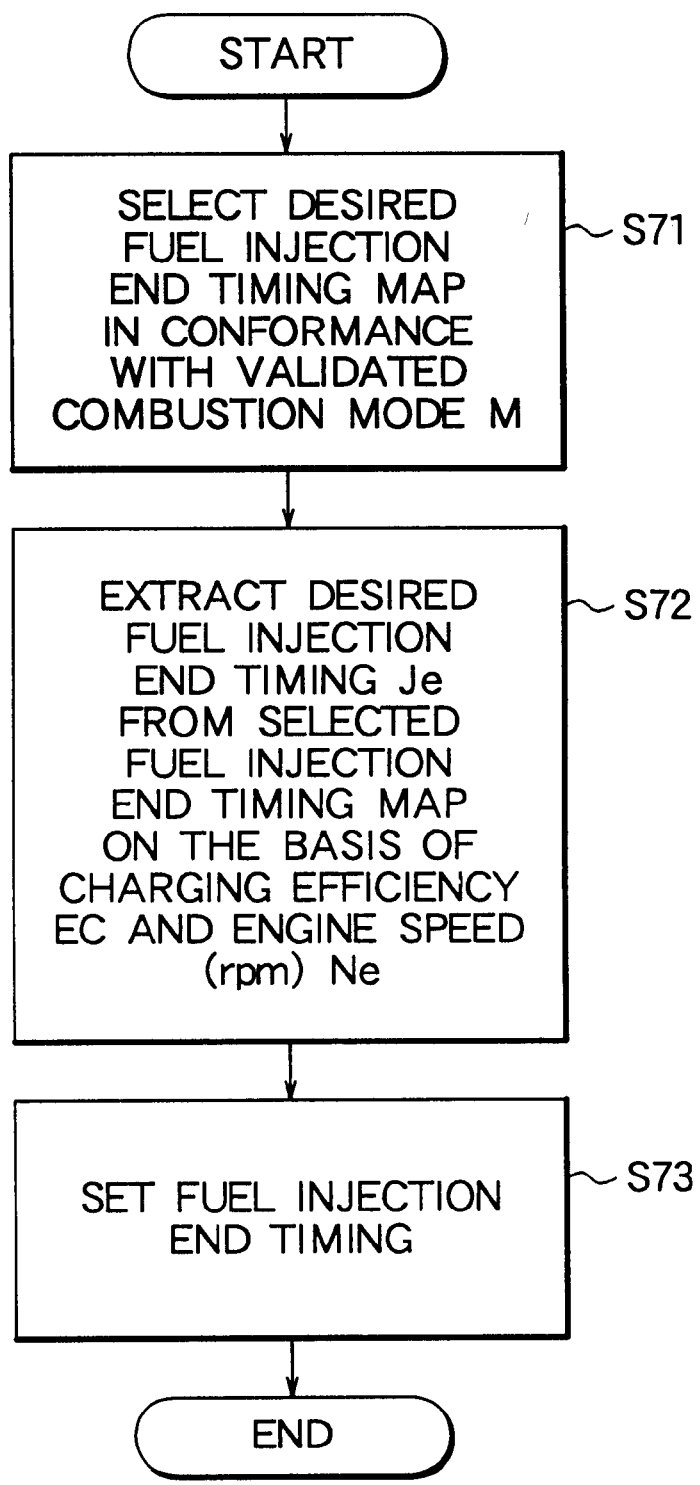
FIG. 9 is a flow chart for illustrating a processing procedure for determining a desired fuel injection end timing in the control system according to the first embodiment of the invention.
Figure 10:
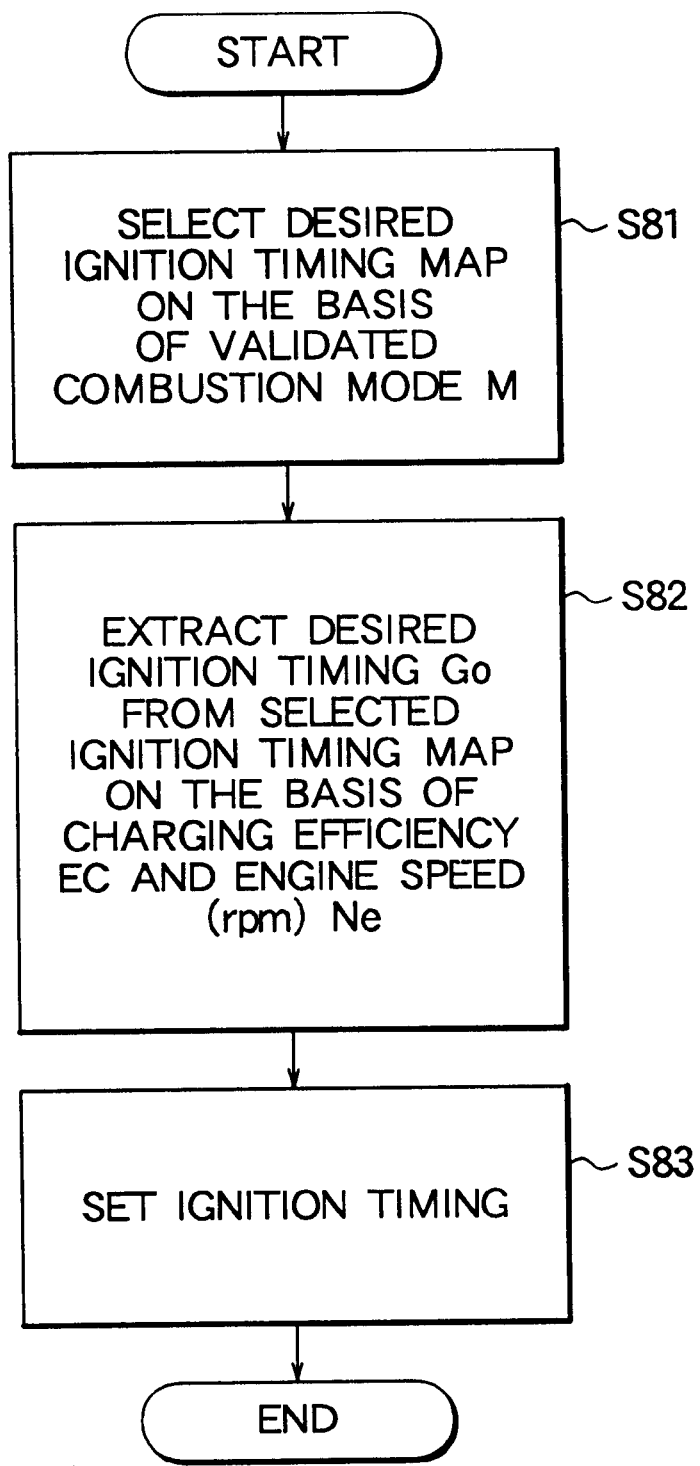
FIG. 10 is a flow chart for illustrating a desired ignition timing setting procedure in the control system according to the first embodiment of the invention.
Figure 11:
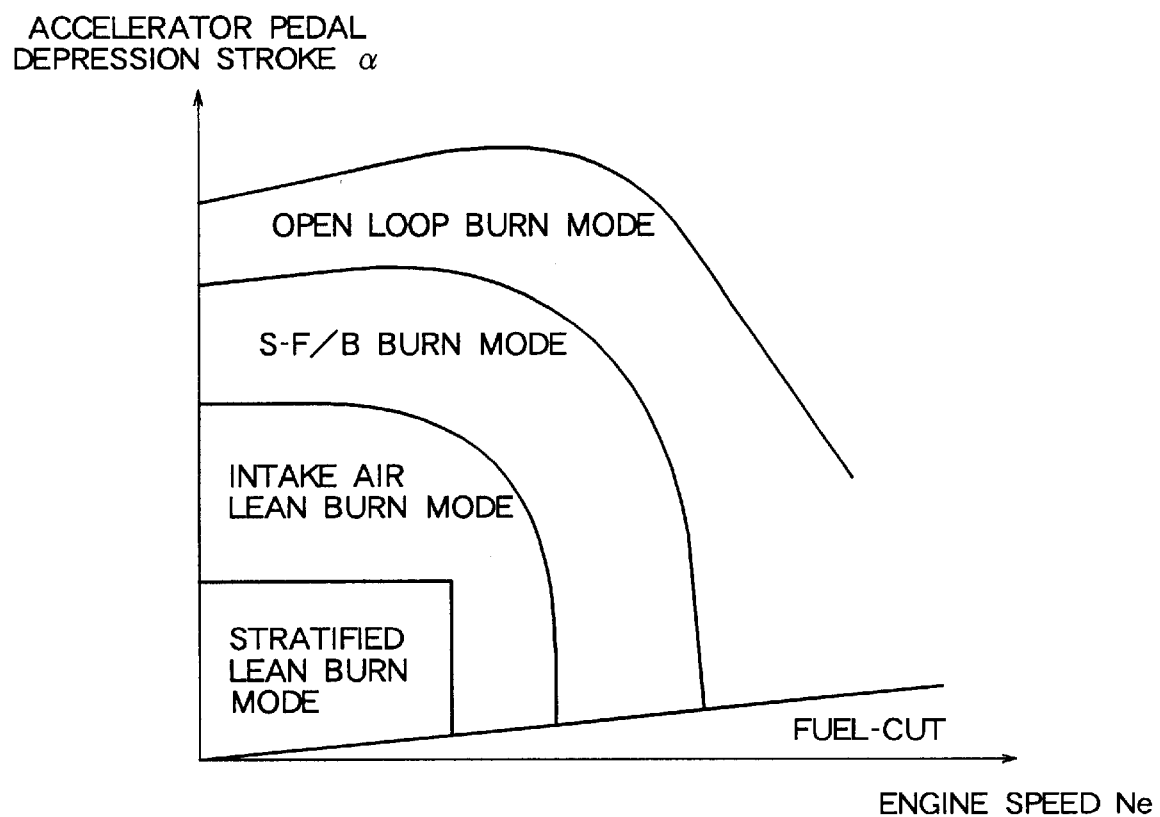
FIG. 11 is a view for illustrating graphically a plurality of combustion modes in terms of accelerator pedal depression stroke and engine rotation number (rpm) in the control system according to the first embodiment of the invention.
Figure 12:
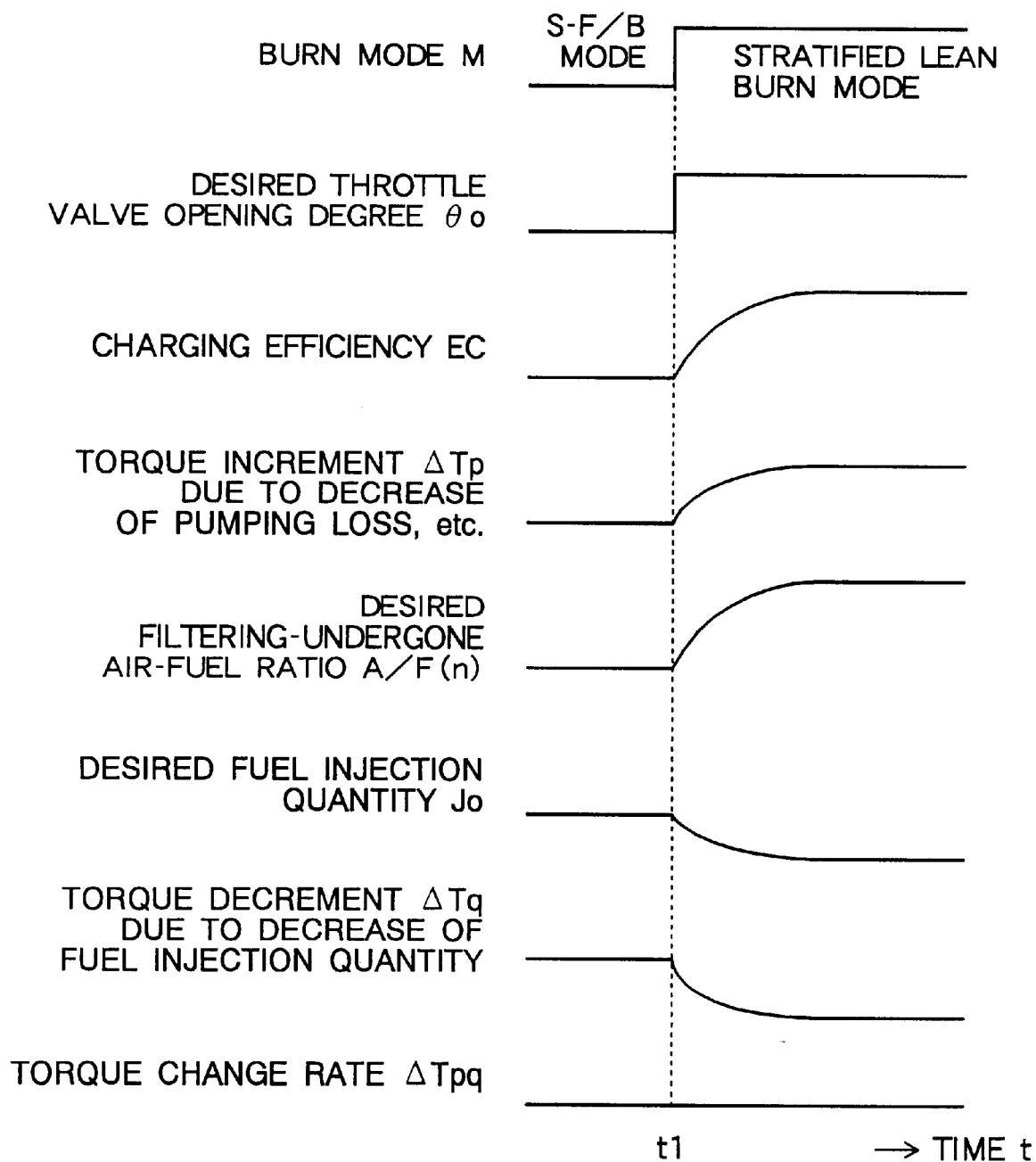
FIG. 12 is a timing chart for illustrating changes of individual control parameters and output torque of the engine which may occur upon changeover of the combustion mode in the control system according to the first embodiment of the invention.

Next, referring to flow charts shown in FIGS. 2 to 10 together with FIG. 11 and a timing chart of FIG. 12 in combination with FIG. 23, description will be directed to the operation of the control system for the cylinder injection type internal combustion engine according to the first embodiment of the invention shown in FIG. 1.

Figure 2:
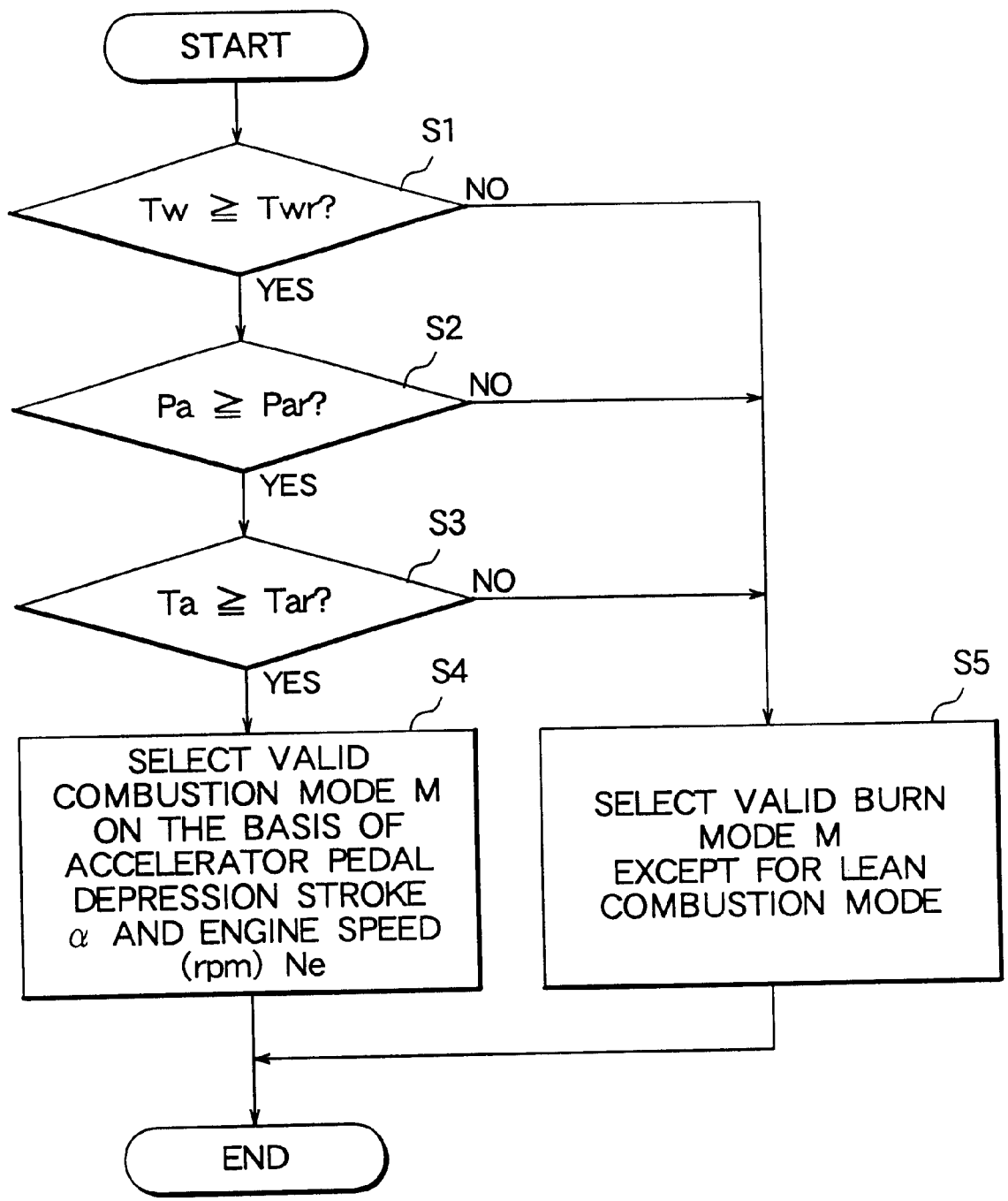
FIG. 2 is a flow chart for illustrating a processing procedure for determining and setting selectively a combustion mode in the control system according to the first embodiment of the invention.

FIG. 2 illustrates a processing routine for determining the combustion mode M, which is executed by the combustion mode determining means 41 while FIGS. 3 to 10 illustrate processing routines for determining the previously mentioned combustion control parameters, respectively.

Figure 3:
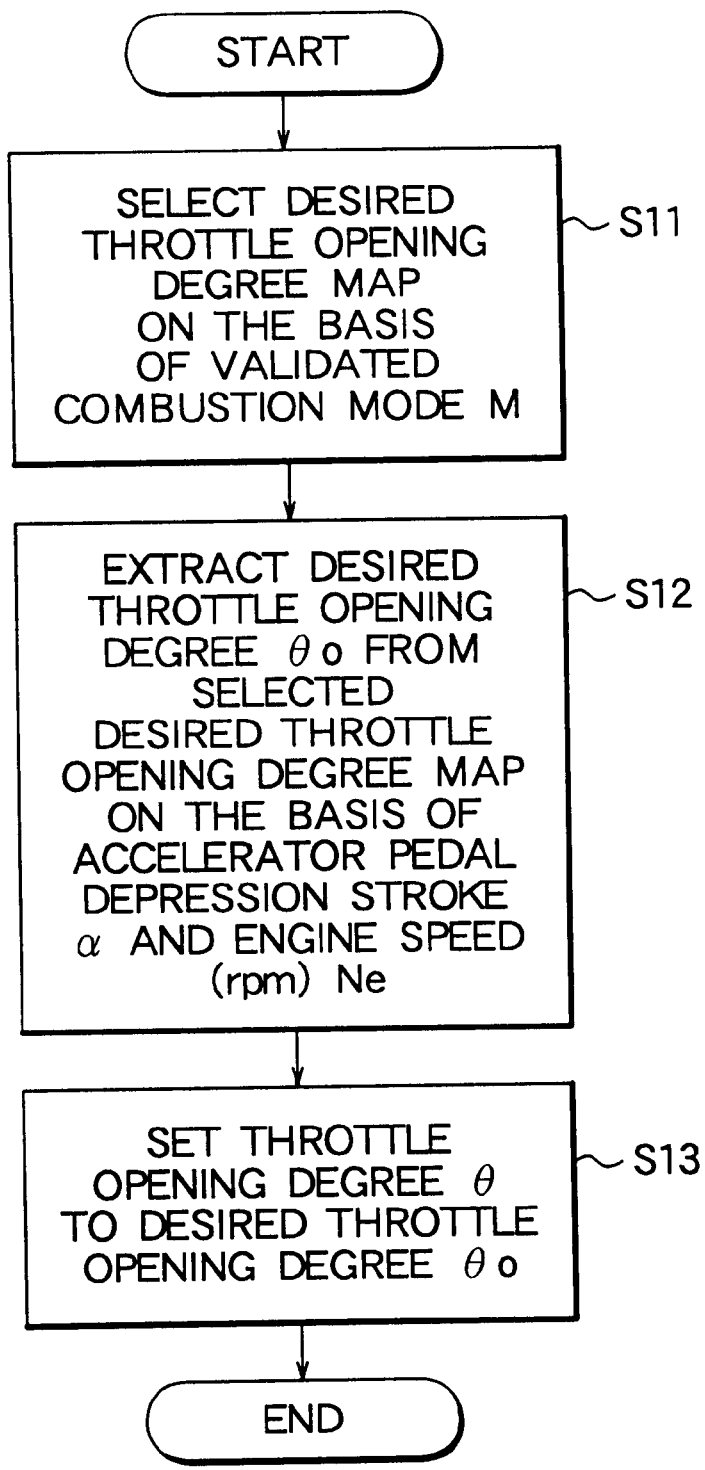
FIG. 3 is a flow chart for illustrating a desired throttle opening degree setting procedure in the control system according to the first embodiment of the present invention.
Figure 4:
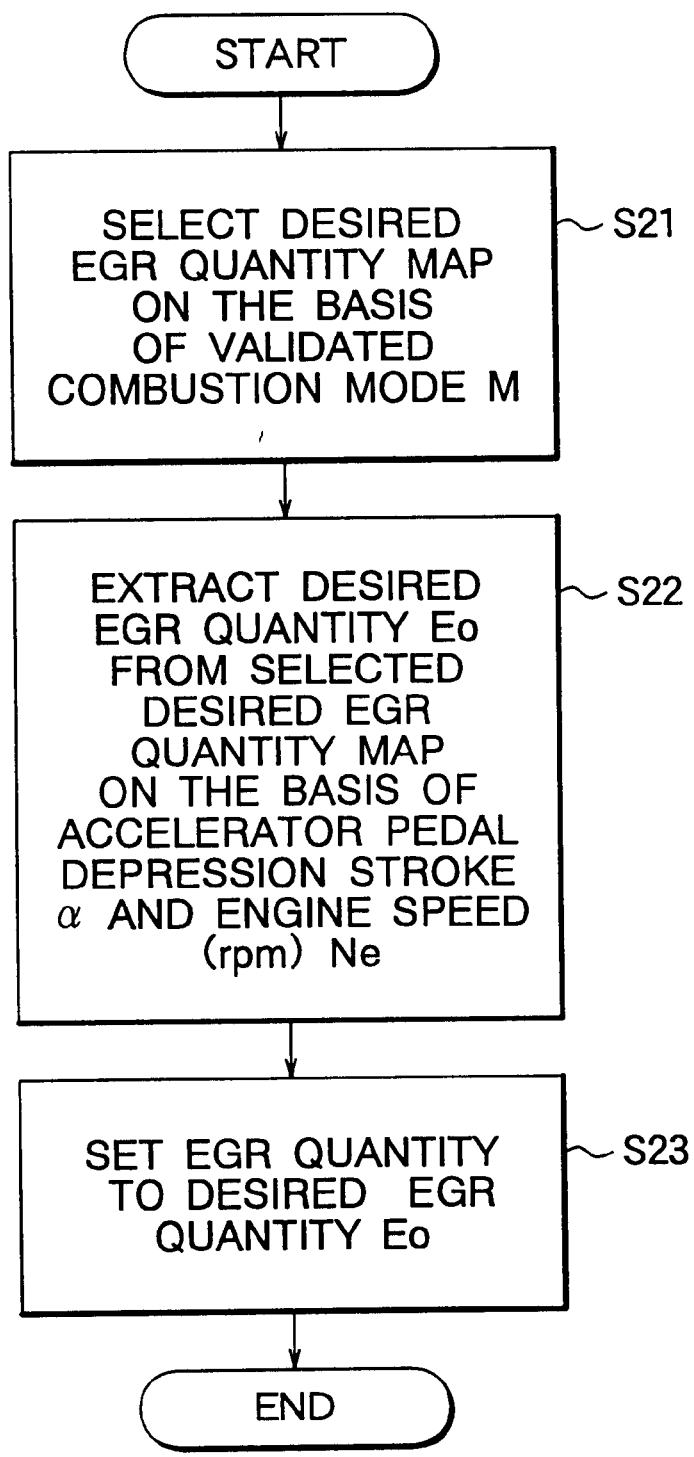
FIG. 4 is a flow chart for illustrating a desired EGR quantity setting procedure in the control system according to the first embodiment of the present invention.
Figure 5:
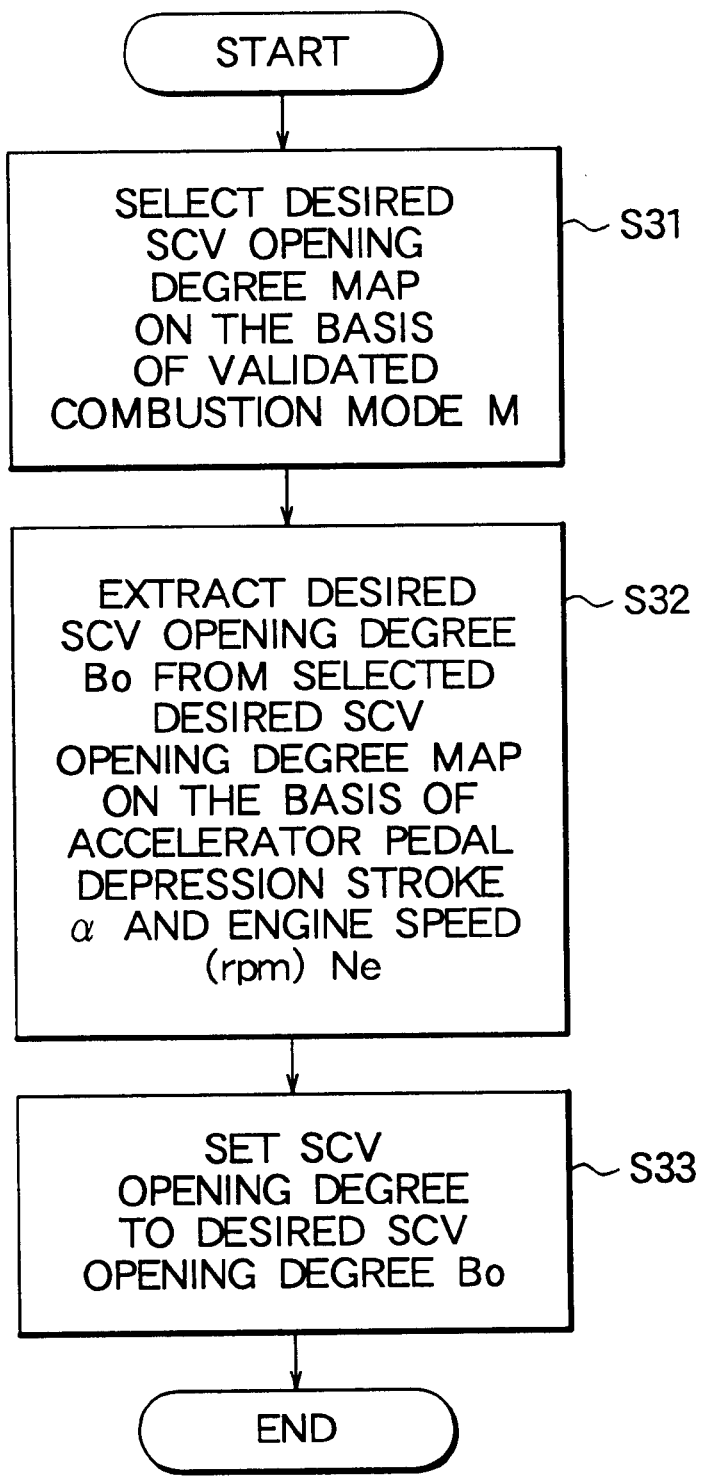
FIG. 5 is a flow chart for illustrating a desired swirl valve opening degree setting procedure in the control system according to the first embodiment of the invention.
Figure 6:
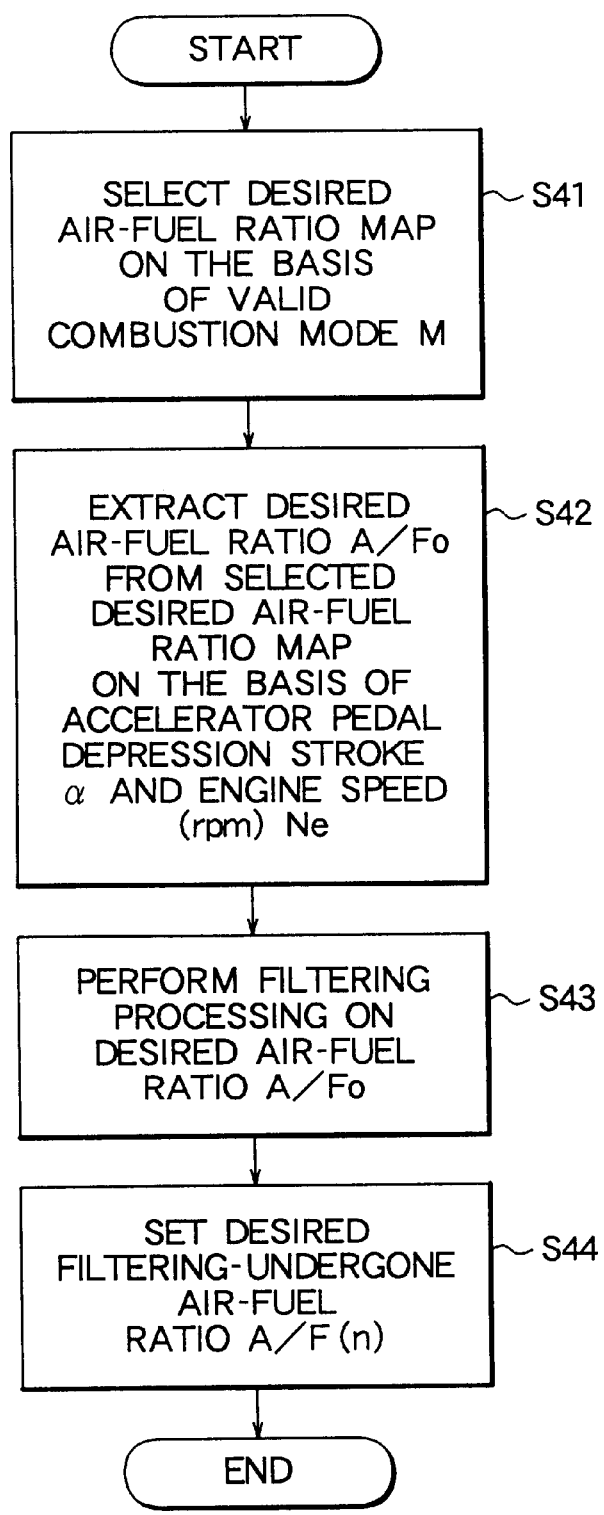
FIG. 6 is a flow chart for illustrating a desired air-fuel ratio setting procedure in the control system according to the first embodiment of the invention.

More specifically, FIGS. 3 to 6 are flow charts for illustrating, respectively, routines for selecting the maps conforming to the determined or valid combustion mode M, which are executed by the control parameter arithmetic means 52, wherein FIG. 3 illustrates a map selecting operation for the desired throttle opening degree map set 44, FIG. 4 illustrates a map selecting operation for the desired EGR map set 45, FIG. 5 illustrates a map selecting operation for the desired swirl rate map set 46, and FIG. 6 illustrates a map selecting operation for the desired air-fuel ratio map set 47.

Figure 7:
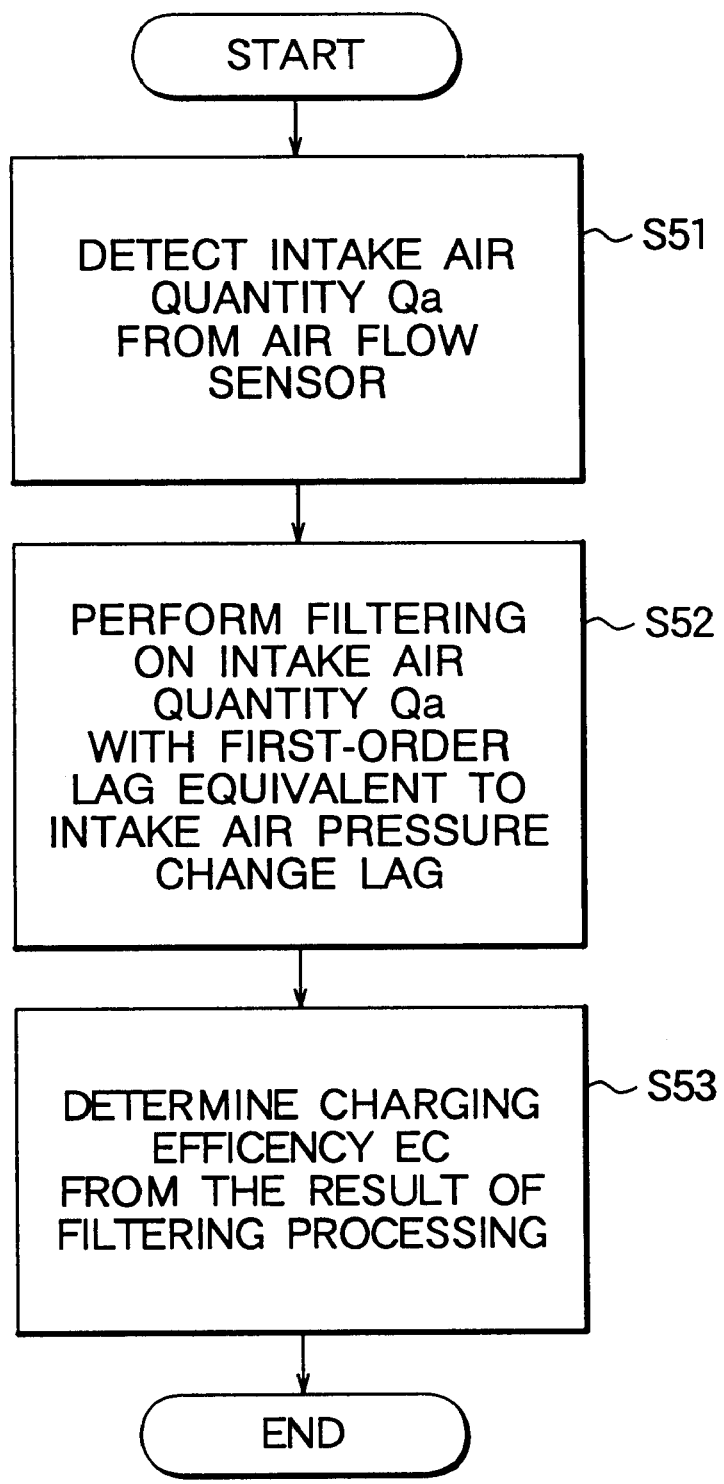
FIG. 7 is a flow chart for illustrating a charging efficiency detection processing procedure in the control system according to the first embodiment of the invention.
Figure 8:
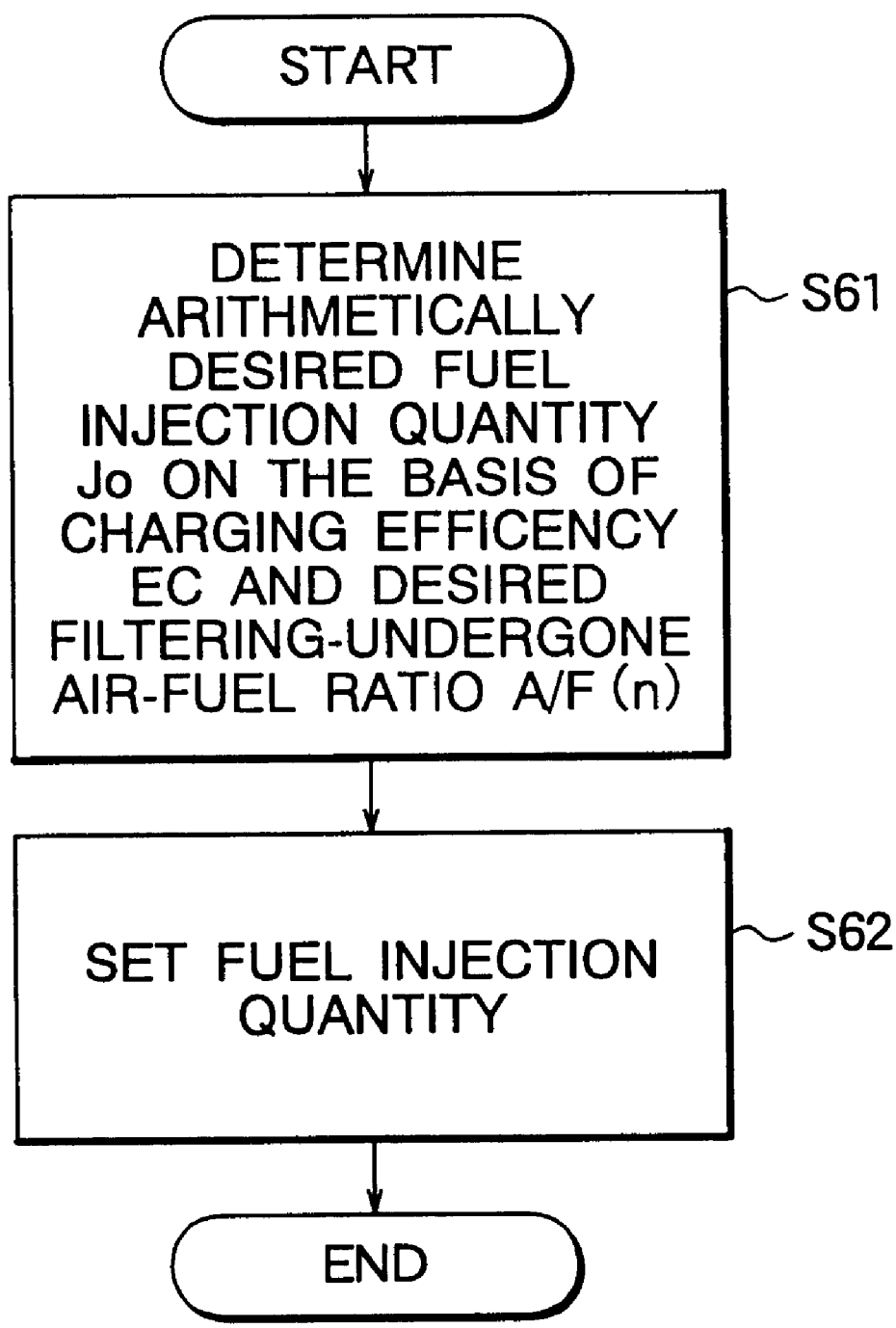
FIG. 8 is a flow chart for illustrating a desired fuel injection quantity determining procedure in the control system according to the first embodiment of the invention.

FIG. 7 illustrates a processing routine executed by the first-order-lag filter 42 and the charging efficiency detecting means 43, while FIG. 8 illustrates a processing routine executed by the desired fuel injection quantity arithmetic means 51. Further, FIGS. 9 and 10 are flow charts showing, respectively, processing routines for selecting maps conforming to the valid combustion mode M, which are executed by the control parameter arithmetic means 52, wherein FIG. 9 illustrates a map selecting operation for the desired fuel injection end timing map set 48 and FIG. 10 illustrates a map selecting operation for the desired ignition timing map set 49.

FIG. 11 is a view for illustrating graphically the relations among the individual combustion modes M in terms of the engine rotation number Ne and the accelerator pedal depression stroke $\alpha$, and FIG. 12 is a timing chart for illustrating changes of the individual control parameters and the output torque of the engine which will occur upon changeover of the combustion modes M.

As can be seen in FIG. 11, the combustion mode M of the cylinder injection type engine is determined on the basis of the map data in dependence on the accelerator pedal depression stroke $\alpha$ and the engine rotation number Ne. Parenthetically, FIG. 11 illustrates the combustion modes which can be set or validated on the ordinary environmental conditions such as indicated by the normal temperature and the ordinary atmospheric pressure.

In general, the combustion mode M of the cylinder injection type engine is set to the stratified lean combustion (burn) mode which is realized by carrying out the fuel injection during the compression stroke (compression-stroke fuel injection) in a low-load/low-speed (rpm) range of the engine where both the accelerator pedal depression stroke $\alpha$ and the engine rotation number Ne are small.

On the other hand, when the accelerator pedal depression stroke $\alpha$ and the engine speed Ne are increased a little as compared with the low-load/low speed operation, the combustion mode M is set to the uniform lean combustion mode in which the fuel injection is carried out during the suction stroke.

When the accelerator pedal depression stroke $\alpha$ and the engine rotation number Ne further increase, the combustion or burn mode M is set to the stoichiometric (air-fuel ratio) feedback combustion mode in which the fuel injection is carried out during the suction stroke.

Further, when the engine is operating in a high-load/high-speed range in which the accelerator pedal depression stroke $\alpha$ and the engine rotation number Ne are much increased, the feedback control of the air-fuel ratio (A/F) is cleared to validate the open loop control.

By contrast, when the engine is operating at a high speed (Ne) with the accelerator pedal depression stroke $\alpha$ being decreased, the combustion mode M is changed over to a fuel-cut mode for decelerating forcibly the engine operation speed.

By the way, in the low-load/low-speed range, the lean combustion mode may be selected by setting the air-fuel ratio to a large value in a range of ca. "20" to "50" with a view to suppressing the pumping loss and the cooling loss to thereby improve the fuel cost performance.

On the other hand, in the high-load and high-speed range, an air-fuel ratio lower which smaller than the stoichiometric air-fuel ratio can be selected. In that case, reduction of the fuel cost can be achieved with high output power of the engine being sustained.

To this end, it is to be mentioned that the lean combustion (burn) mode is likely to become unstable when the engine 1 is operating in the cold state or when the atmospheric pressure is low as in the case of driving a motor vehicle equipped with the engine in a highland area or when the motor vehicle is being driven in a cold district with a low intake-air temperature.

Such being the circumstances, when the conditions for the combustion (burning) have changed for the worse, as described above, the combustion mode determining means 41 then selects a combustion mode other than the lean combustion mode, e.g. the stoichiometric feedback combustion mode, to thereby ensure stabilization of the combustion with priority.

Further, it should be mentioned that in the cylinder injection type gasoline engine, the control parameters for the combustion can be set with a relatively high degree of freedom. Thus, for the gasoline engine, there may be prepared previously for each of plural combustion modes M a set of the desired throttle opening degree maps 44, a set of the desired EGR maps 45, a set of the desired swirl rate maps 46, a set of the desired air-fuel ratio maps 47, a set of the desired fuel injection end timing maps 48 and a set of the desired ignition timing maps 49.

As can be seen in FIG. 1, by storing plural sets of data maps previously in the ECU 12A, it is possible to obtain a desired engine output torque by setting the control parameters in dependence on e.g. the accelerator pedal depression stroke $\alpha$ and the engine rotation number Ne by referencing the relevant maps. Parenthetically, the map data values for the control parameters in the individual combustion modes M are so selected or determined that the fuel cost performance as well as the exhaust gas quality can be enhanced uppermost in the steady or cruising operation of the engine.

Now, referring to FIG. 2, in a step S1, the combustion mode determining means 41 decides first whether or not the cooling water temperature Tw is equal to or higher than a predetermined cooling water temperature Twr (the temperature indicating the warmed-up state of the engine 1).

When it is decided in the step S1 that Tw≧Twr, (i.e., when the decision step S1 results in affirmation "YES") with the engine 1 being in the warmed-up state, decision is then made in a step S2 as to whether or not the atmospheric pressure Pa is equal to or higher than a predetermined atmospheric pressure Par (i.e., atmospheric pressure in a lowland area).

Now, it is assumed that a motor vehicle equipped with the engine now concerned is being driven in a lowland area. In that case, it will be decided in the step S2 that Pa≧Par, (i.e., the decision step S2 results in affirmation "YES"). Then, decision is made in a step S3 as to whether or not the intake air temperature Ta is equal to or higher than a predetermined intake air temperature Tar (i.e., ordinary environmental or ambient temperature).

When the outside air temperature is at an ordinary level and when it is decided that Ta≧Tar, (i.e., when the decision step S3 results in affirmation "YES"), this means that the environmental factors for the motor vehicle operation satisfy the ordinary conditions for the fuel combustion. Accordingly, the combustion mode determining means 41 selects one combustion mode M on the basis of the accelerator pedal depression stroke α and the engine rotation number Ne (step S4), whereon the processing routine illustrated in FIG. 2 comes to an end.

By contrast, when it is decided in any one of the steps S1 to S3 that the cooling water temperature Tw is lower than the predetermined cooling water temperature Twr (Tw<Twr), the atmospheric pressure Pa is smaller than the predetermined atmospheric pressure Par (Pa<Par) or the intake air temperature Ta is lower than the predetermined intake air temperature Tar (Ta<Tar), i.e., when any one of the steps S1 to S3 results in negation "NO", this means that the environmental factors cause the conditions for the fuel combustion to become worse. In that case, the combustion mode determining means 41 selects another combustion mode M other than the lean combustion mode on the basis of the accelerator pedal depression stroke α and the engine rotation number Ne (step S5), whereon the processing routine illustrated in FIG. 2 comes to an end.

In the desired throttle opening degree setting procedure or routine illustrated in FIG. 3, the control parameter arithmetic means 52 first selects one data map from the desired throttle opening degree map set 44 in conformance with the currently valid combustion mode M (indicated by a map value) in a step S11.

In succession, the control parameter arithmetic means 52 extracts the desired throttle valve opening degree Go from the selected desired throttle opening degree map 44 on the basis of the accelerator pedal depression stroke α and the engine rotation number Ne (step S12).

Finally, the intake-air flow control signal A indicative of the desired throttle valve opening degree θo as extracted is outputted to the throttle valve actuator 7 to thereby control the throttle opening degree θ so that it coincides with the desired throttle opening degree θo (step S13), whereon the processing routine illustrated in FIG. 3 is terminated.

Next, in the desired EGR quantity setting routine shown in FIG. 4, the control parameter arithmetic means 52 first selects one data map from the desired EGR map set 45 on the basis of the selected or currently valid combustion mode M (step S21).

In succession, the control parameter arithmetic means 52 extracts the desired EGR regulating valve opening degree Eo from the selected map on the basis of the accelerator pedal depression stroke α and the engine rotation number Ne (step S22).

Finally, the EGR control signal E indicative of the desired EGR valve opening degree Eo as extracted is outputted to the actuator for the EGR regulating valve 17 to thereby control the opening degree of the EGR regulating valve 17 so that it coincides with the desired EGR regulating valve opening degree Eo (step S23), whereon the processing routine illustrated in FIG. 4 comes to an end.

Further, in the desired swirl control valve setting routine shown in FIG. 5, the control parameter arithmetic means 52 first selects one data map from the desired swirl rate map set 46 in conformance with the currently valid combustion mode M (step S31).

Subsequently, the control parameter arithmetic means 52 extracts the desired swirl valve opening degree (also referred to as the SCV opening degree) Bo from the selected map on the basis of the accelerator pedal depression stroke α and the engine rotation number Ne in a step S32.

Finally, the swirl control signal B indicative of the extracted desired swirl control valve (SCV) opening degree Bo is outputted to the swirl control valve actuator (SCV actuator) 19 to thereby control the opening degree of the swirl control valve 18 so that it coincides with the desired swirl valve (SCV) opening degree Bo (step S33), whereon the processing routine illustrated in FIG. 5 comes to an end.

Now, in the desired air-fuel ratio setting routine shown in FIG. 6, the control parameter arithmetic means 52 first selects one map from the set of the desired air-fuel ratio maps 47 in conformance with the currently valid combustion mode M (step S41).

In succession, the control parameter arithmetic means 52 extracts the desired air-fuel ratio A/Fo from the selected map on the basis of the accelerator pedal depression stroke α and the engine rotation number Ne in a step S42.

Subsequently, the desired air-fuel ratio A/Fo as extracted undergoes filter processing through the desired air-fuel ratio filter 50 in accordance with the undermentioned expression (1), whereby the desired filtering-undergone air-fuel ratio A/F(n) is determined (step S43).

$$A/F(n)=K^*A/F(n-1)+(K-1)^*A/Fo(n) \tag{1}$$

In the above expression (1), K(<1) represents a filter coefficient, A/F(n−1) represents a desired filtering-undergone air-fuel ratio in the preceding desired air-fuel ratio determining routine, and A/Fo(n) represents the desired mair-fuel ratio extracted currently.

Finally, the desired filtering-undergone air-fuel ratio A/F (n) determined arithmetically in accordance with the expression (1) is set or validated (step S43), whereon the processing routine illustrated in FIG. 6 is terminated.

Further, in the charging efficiency detection processing illustrated in FIG. 7, the intake air quantity Qa is first detected synchronously with detection of the pulse edge of the crank angle signal CA upon every half turn of the crank shaft of the engine 1 (step S51).

In succession, the first-order-lag filter 42 performs on the intake air quantity Qa a first-order-lag filter processing for compensating for the lag involved in the detection of the intake air quantity Qa due to the time required for the intake-air to flow through the intake pipe 1a (step S52).

Finally, the charging efficiency detecting means 43 detects the charging efficiency EC on the basis of the intake air quantity undergone the filter processing and the engine rotation number (rpm) Ne in a step S53, whereon the processing routine illustrated in FIG. 7 comes to an end.

Furthermore, in the desired fuel injection quantity determining processing illustrated in FIG. 8, the desired fuel injection quantity arithmetic means 51 arithmetically determines the desired fuel injection quantity Jo on the basis of the charging efficiency EC and the desired filtering-undergone air-fuel ratio A/F(n) (step S61).

In succession, the control parameter arithmetic means 52 generates the fuel injection signal J indicative of the desired fuel injection quantity Jo (step S62), whereon the processing routine illustrated in FIG. 8 is terminated.

Further, in the case of the processing routine for determining the desired fuel injection end timing illustrated in FIG. 9, the control parameter arithmetic means 52 first selects one data map from the desired fuel injection end timing map set 48 in conformance with the currently valid combustion mode M (step S71).

In succession, the control parameter arithmetic means 52 extracts the desired fuel injection end timing Je from the selected map on the basis of the charging efficiency EC and the engine rotation number Ne (step S72).

Finally, the fuel injection signal J indicative of the desired fuel injection quantity Jo and the desired fuel injection end timing Je is outputted to the fuel injector 13 to thereby set the fuel injection end timing so that the fuel injection quantity coincides with the desired fuel injection quantity and that the fuel injection timing (fuel injection end timing) coincides with the desired fuel injection end timing Je at each cylinder (step S73). Then, the processing routine illustrated in FIG. 9 comes to an end.

Further, in the desired ignition timing setting routine illustrated in FIG. 10, the control parameter arithmetic means 52 first selects one data map from the desired ignition timing map set 49 in conformance with the currently valid combustion mode M (step S81).

In succession, the control parameter arithmetic means 52 extracts the desired ignition timing Go from the selected map on the basis of the charging efficiency EC and the engine rotation number Ne (step S82).

Finally, the ignition signal G indicative of the desired ignition timing Go is supplied to the ignitor 11 to thereby validate the ignition timing such that the ignition timing of each cylinder coincides with the desired ignition timing Go (step S83), whereon the processing routine illustrated in FIG. 10 comes to an end.

In this way, the control parameters for combustion (i.e., the fuel injection end timing and the ignition timing) are set on the basis of the charging efficiency EC and the engine rotation number (rpm) Ne in conformance with the currently validated combustion mode.

At this juncture, it should be mentioned that in practical applications, the desired filtering-undergone air-fuel ratio A/F(n) is arithmetically determined in dependence on the charging efficiency EC through the filter processing in which the charging efficiency EC is taken into account.

In this manner, the desired filtering-undergone air-fuel ratio A/F(n), the desired fuel injection end timing Je and the desired ignition timing Go are controlled in response to the change in the charging efficiency EC in the cylinders. Thus, no departure from the optimum values can taken place even in the transient operation phases of the engine. Thus, the fuel cost performance of the engine can be improved with the exhaust gas quality being enhanced.

Furthermore, because the fuel injection signal J and the ignition signal G indicative of the fuel injection end timing and the ignition timing, respectively, are controlled in dependence on the cylinder charging efficiency EC, the fuel injection and the ignition can be controlled optimally with high accuracy regardless of variance in the mechanical structure of the intake or suction system.

Thus, in any operation state of the cylinder injection type gasoline engine, the control parameters for the combustion (burning) can be set optimally, whereby the fuel cost can be reduced with the quality of the exhaust gas being improved significantly.

Next, description will be directed to the control operation involved in changing the combustion mode M.

FIG. 12 shows schematically changes of the individual control parameters and torque as a function of time lapse on the assumption that the combustion (burn) mode M is changed over from the stoichiometric feedback mode S–F/B to the stratified lean combustion mode at a time point t1.

At first, at the time point t1 the combustion mode M is changed over, the desired throttle valve opening degree Go is modified so that the charging efficiency EC can increase.

In that case, due to a lag in the increase of the pressure within the intake pipe 1a (i.e., because the pressure within the intake pipe 1a can not increase instantaneously in response to the increase of opening degree of the throttle valve as commanded by depression of the accelerator pedal), the charging efficiency EC increases only gradually with a first-order lag, as can be seen in FIG. 12.

On the other hand, since the pumping loss bears correlation with the pressure within the intake pipe, torque increment ΔTp owing to decrease of the pumping loss coincides substantially with the change behavior of the charging efficiency EC around the mode changeover time point t1. Thus, the desired fuel injection quantity arithmetic means 51 decreases the desired fuel injection quantity Jo on the basis of the desired filtering-undergone air-fuel ratio A/F(n) which reflects the change behavior or characteristic of the charging efficiency EC, as a result of which torque decrement ΔTq due to decrease of the desired fuel injection quantity Jo changes in such a manner as graphically illustrated in FIG. 12.

In this way, torque change or deviation ΔTpq (=ΔTp−ΔTq) can be suppressed to zero around the combustion mode changeover time point t1, which in turn means that the torque shock which may otherwise occur upon changeover of the combustion mode can be suppressed satisfactorily.

Parenthetically, when the combustion mode M is changed over from the stratified lean combustion (burn) mode to the stoichiometric feedback combustion mode (S–F/B mode), the signals in FIG. 12 take the waveforms inverted in polarity to those illustrated in the same figure.

Thus, even in the transient operation state such as acceleration/deceleration operation state, the control parameters (the fuel injection timing and the ignition timing) can be set to optimum values with high accuracy on the basis of the engine rotation number Ne and the intake air quantity Qa, whereby the exhaust gas quality as well as the fuel-cost performance can be improved significantly.

Furthermore, because the desired air-fuel ratio filter 50 is provided with a view to generating the desired air-fuel ratio (desired filtering-undergone air-fuel ratio) A/F(n) which reflects the change of the intake air quantity Qa, the control of the air-fuel ratio can be performed with enhanced accuracy in dependence on the actual load state of the engine even in the transient operation phases thereof.

Besides, the combustion mode M other than the lean combustion mode (e.g. stoichiometric feedback combustion mode S–F/B) is selected in the case of such situations that the lean combustion becomes unstable, as exemplified by low cooling-water temperature Tw of the engine 1, low atmospheric pressure Pa as encountered in the driving the motor vehicle in a highland area, extremely low intake-air temperature Ta as encountered in the driving in a cold district or the like. In this manner, the combustion state of the engine 1 can be stabilized, which contributes to further enhancement of drivability and reduction of the harmful components carried by the exhaust gas.

Additionally, by virtue of the feature that the control parameter arithmetic means 52 is so designed as to control the EGR regulating valve 17 on the basis of the desired EGR valve opening degree Eo which reflects the accelerator pedal depression stroke α and the engine rotation number Ne, the EGR quantity can be controlled optimally in dependence on the actual engine load. Moreover, the control procedure to this end can be simplified.

Furthermore, since the control parameter arithmetic means 52 is so designed as to control the swirl control valve (SCV) 18 on the basis of the desired swirl valve opening degree Bo in dependence on the accelerator pedal depression stroke α and the engine rotation number Ne, the swirl rate can be controlled optimally and accurately in consideration of the actual engine load.

Embodiment 2

In the control system for the cylinder injection type internal combustion engine according to the first embodiment of the invention, no description has been made concerning the control of the desired fuel injection end timing Je and the desired ignition timing Go upon changeover of the combustion modes. However, in view of suppression of the torque shock, it is preferred to delay the setting of the desired fuel injection end timing Je and the desired ignition timing Go relative to the changeover timing of the combustion modes M.

In the following, description will be directed to a control system for the cylinder injection type engine according to a second embodiment of the present invention by reference to the drawings. In the control system now of concern, the desired fuel injection end timing Je and the desired ignition timing Go are set with a delay relative to the combustion mode changeover timing.

To this end, the control parameter arithmetic means 52 incorporated in the ECU 12A is so designed as to delay the map-based control for at least one of the fuel injection signal J and the ignition signal G until the air-fuel ratio of the engine 1 has reached a predetermined value (A/Fr) after the combustion mode M was changed over.

In the control system according to the second embodiment of the invention, the control parameter arithmetic means 52 may employ as the air-fuel ratio for determining the desired fuel injection end timing Je and the desired ignition timing Go the desired filtering-undergone air-fuel ratio A/F(n) determined arithmetically on the basis of the data maps stored internally of the ECU 12A or the actual air-fuel ratio F detected within the exhaust pipe 1b (see FIG. 23).

Figure 13:
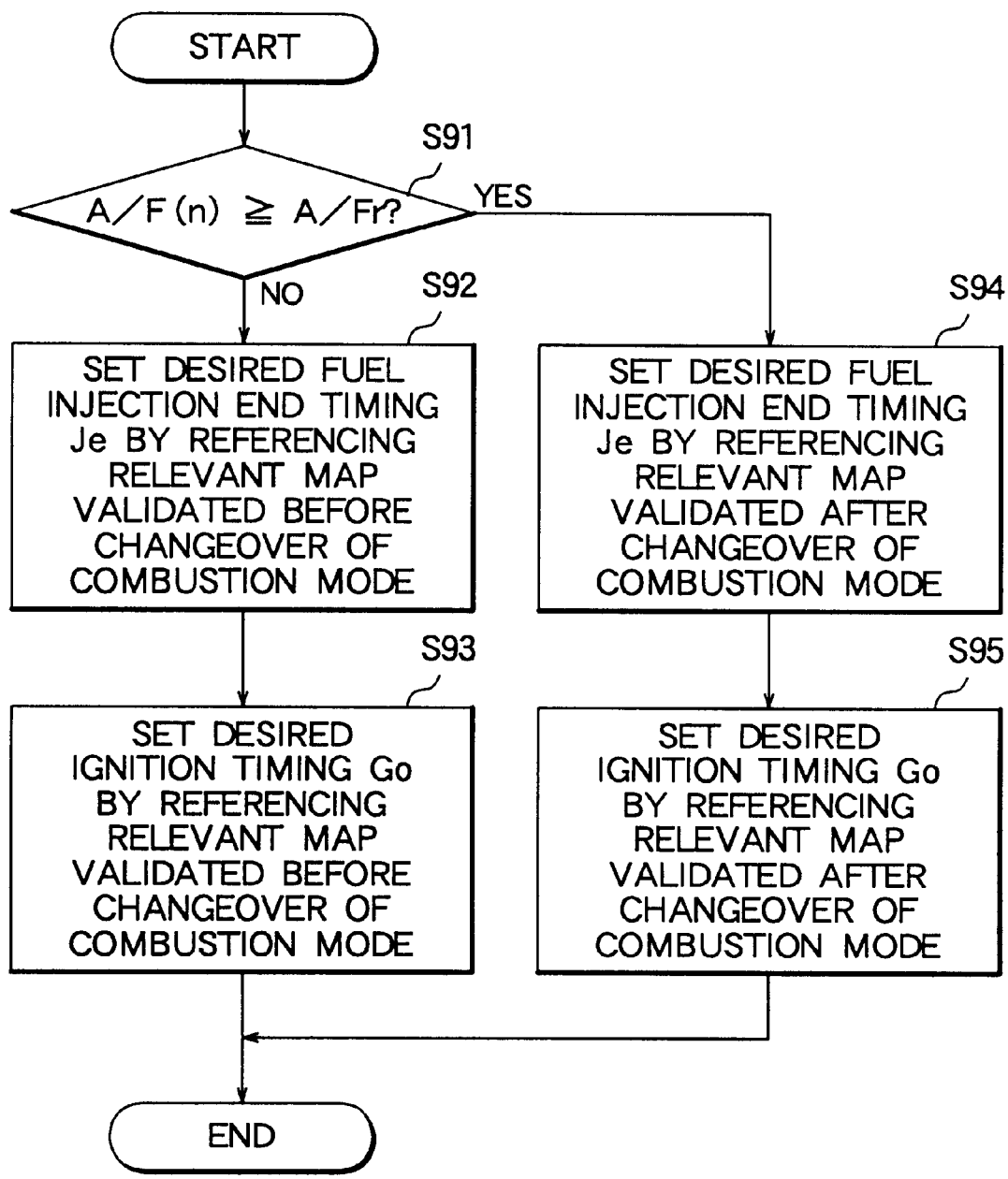
FIG. 13 is a flow chart for illustrating a data map changeover processing procedure for a desired fuel injection end timing and a desired ignition timing upon changeover of the combustion modes in the control system according to a second embodiment of the present invention.
Figure 14:
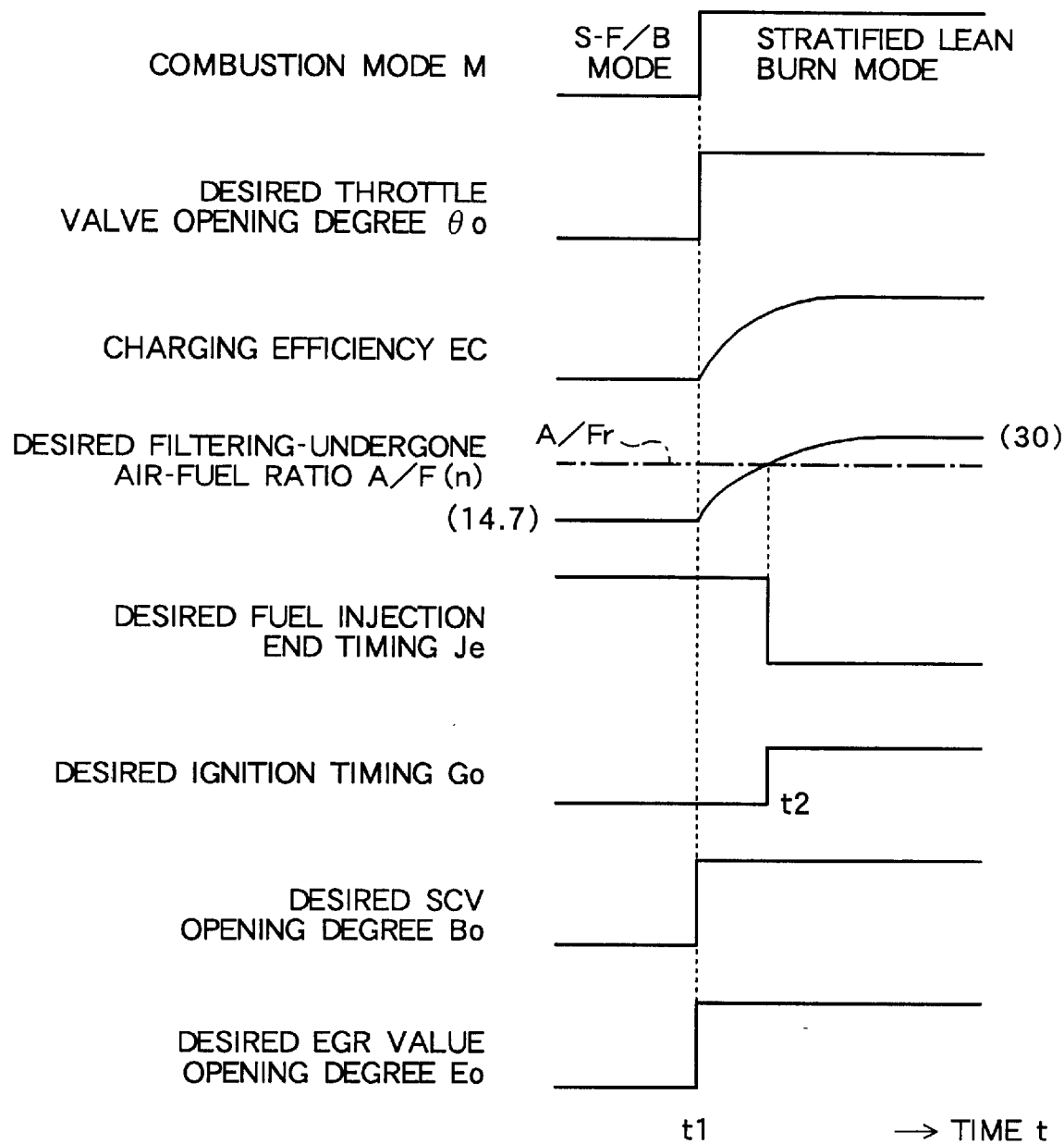
FIG. 14 is a timing chart for illustrating a data map changeover processing for the desired fuel injection end timing and the desired ignition timing upon changeover of the combustion mode in the control system according to the second embodiment of the invention.

FIG. 13 is a flow chart for illustrating the processing procedure for changing over the combustion mode in the control system according to the second embodiment of the invention, and FIG. 14 is a timing chart for illustrating schematically change behaviors of the control parameters in the control system according to the instant embodiment.

Incidentally, the functional arrangement of the control system according to the instant embodiment of the invention is substantally same as that shown in FIG. 1 except for the map selection processing procedure to be executed for the desired fuel injection end timing map set 48 and the desired ignition timing map set 49 in conformance with the validated combustion mode M.

When the changeover of the combustion mode M from the stoichiometric feedback combustion mode S–F/B to the stratified lean combustion mode is started at a time point t1 shown in FIG. 14, the control parameter arithmetic means 52 determines or sets the control parameters for the combustion (i.e., the desired fuel injection end timing Je and the desired ignition timing Go) in accordance with a processing routine illustrated in FIG. 13.

Referring to FIG. 13, upon change of the combustion mode, the desired filtering-undergone air-fuel ratio A/F(n) is first compared with a predetermined air-fuel ratio A/Fr for deciding whether or not the desired filtering-undergone air-fuel ratio A/F(n) is equal to or greater than the predetermined air-fuel ratio A/Fr (step S91).

In general, upon changeover of the combustion mode M, the charging efficiency EC and the desired filtering-undergone air-fuel ratio A/F(n) increase gradually with the first-order lag as the intake air quantity Qa increases.

More specifically, the desired filtering-undergone air-fuel ratio A/F(n) increases gradually from the value (14.7) in the stoichiometric feedback combustion mode toward the value (ca. 30) in the stratified lean combustion mode upon changeover of the combustion mode M at the time point t1.

When it is decided in a step S91 shown in FIG. 13 that the desired filtering-undergone air-fuel ratio A/F(n) is smaller than the predetermined air-fuel ratio A/Fr, i.e., when A/F(n) <A/Fr or when the decision step S91 results in negation "NO", indicating that the desired filtering-undergone air-fuel ratio A/F(n) has not reached the predetermined air-fuel ratio A/Fr, the control parameter arithmetic means 52 references the desired fuel injection end timing map 48 and the desired ignition timing map 49 validated before the combustion mode changeover.

Thus, the desired fuel injection end timing Je and the desired ignition timing Go are set or determined by referencing the relevant maps validated or selected before the combustion mode M has been changed over (steps S92 and S93), whereon the processing routine illustrated in FIG. 13 is terminated.

On the other hand, when decision is made in the step S91 that the desired filtering-undergone air-fuel ratio A/F(n) is not smaller than the predetermined air-fuel ratio A/Fr or that A/F(n)≧A/Fr, (i.e., when the decision step S91 results in affirmation "YES"), indicating that the desired filtering-undergone air-fuel ratio A/F(n) has reached the predetermined air-fuel ratio A/Fr, the control parameter arithmetic means 52 then sets or determines the desired fuel injection end timing Je and the desired ignition timing Go on the basis of the respective relevant maps validated upon changeover of the combustion mode M (steps S94 and S95), whereon the processing routine illustrated in FIG. 13 comes to an end.

In this way, the desired fuel injection end timing Je and the desired ignition timing Go are changed over to the respective values which correspond to the currently valid combustion mode M (stratified lean combustion mode) at a time point t2 when the desired filtering-undergone air-fuel ratio A/F(n) has reached the air-fuel ratio, as can be seen in FIG. 14.

To say in another way, the combustion mode to be applied to the fuel injection timing control and the ignition timing control is changed over at the time point t2 when the actual air-fuel ratio of the engine 1 has reached the predetermined air-fuel ratio A/Fr by taking into account the range of air-fuel ratios where the combustion or burn can remain stable around the combustion mode changeover timing.

The control parameters of the other data maps 44 to 46 are changed over at the same time when the combustion mode M is changed over because responses of these parameters to the changeover of the combustion mode may be accompanied with greater delay when compared with the control parameters for the desired fuel injection end timing and the ignition timing. More specifically, values of the desired throttle valve opening degree θo, the desired EGR valve opening degree Eo and the desired swirl valve opening degree Bo are changed over stepwise exactly at the time point t1, as can be seen in FIG. 14.

At this juncture, it should however be mentioned that although the value of the desired air-fuel ratio A/Fo set by referencing the relevant desired air-fuel ratio map 47 is changed stepwisely, the desired filtering-undergone air-fuel ratio A/F(n) is made to change gradually in conformance with the change behavior of the charging efficiency EC, as illustrated in FIG. 14, because the desired air-fuel ratio filter 50 is provided for performing the filtering processing on the desired air-fuel ratio A/Fo.

As will now be appreciated from the foregoing, in the control system according to the second embodiment of the invention, the values of the desired fuel injection end timing Je and the desired ignition timing Go are set by referencing the respective relevant maps for the stoichiometric feedback combustion mode S–F/B until the desired filtering-undergone air-fuel ratio A/F(n) has reached the predetermined air-fuel ratio A/Fr, while being set on the basis of the respective relevant maps for the stratified lean combustion mode after the former has reached the latter.

In this manner, through a simple control processing of delaying the desired fuel injection end timing and the desired ignition timing upon changeover of the combustion mode M, the torque shock which may otherwise occur upon changeover of the combustion mode M can be suppressed without incurring any appreciable degradation in the exhaust gas quality.

Furthermore, even in the transient engine operation phases, the control parameters (the desired fuel injection end timing and the desired ignition timing) can be set accurately to the respective optimum values on the basis of the engine rotation number Ne and the intake air quantity Qa regardless of variance in the mechanical structure of the intake system of the engine. Thus, the quality of exhaust gas as well as the fuel cost performance of the engine can further be improved.

The advantageous effects mentioned above can be achieved equally when the combustion mode M is changed over from the stratified lean combustion mode to the stoichiometric feedback combustion mode S–F/B.

Embodiment 3

In the control system for the cylinder injection type internal combustion engine according to the second embodiment of the invention, the time point t2 for changing over the control parameter values upon changeover of the combustion mode is determined by using the desired filteringundergone air-fuel ratio A/F(n) outputted from the desired air-fuel ratio filter 50. However, the air-fuel ratio F detected actually within the exhaust pipe 1b by air-fuel ratio sensor 6 (see FIG. 23) may equally be employed to this end.

Figure 15:
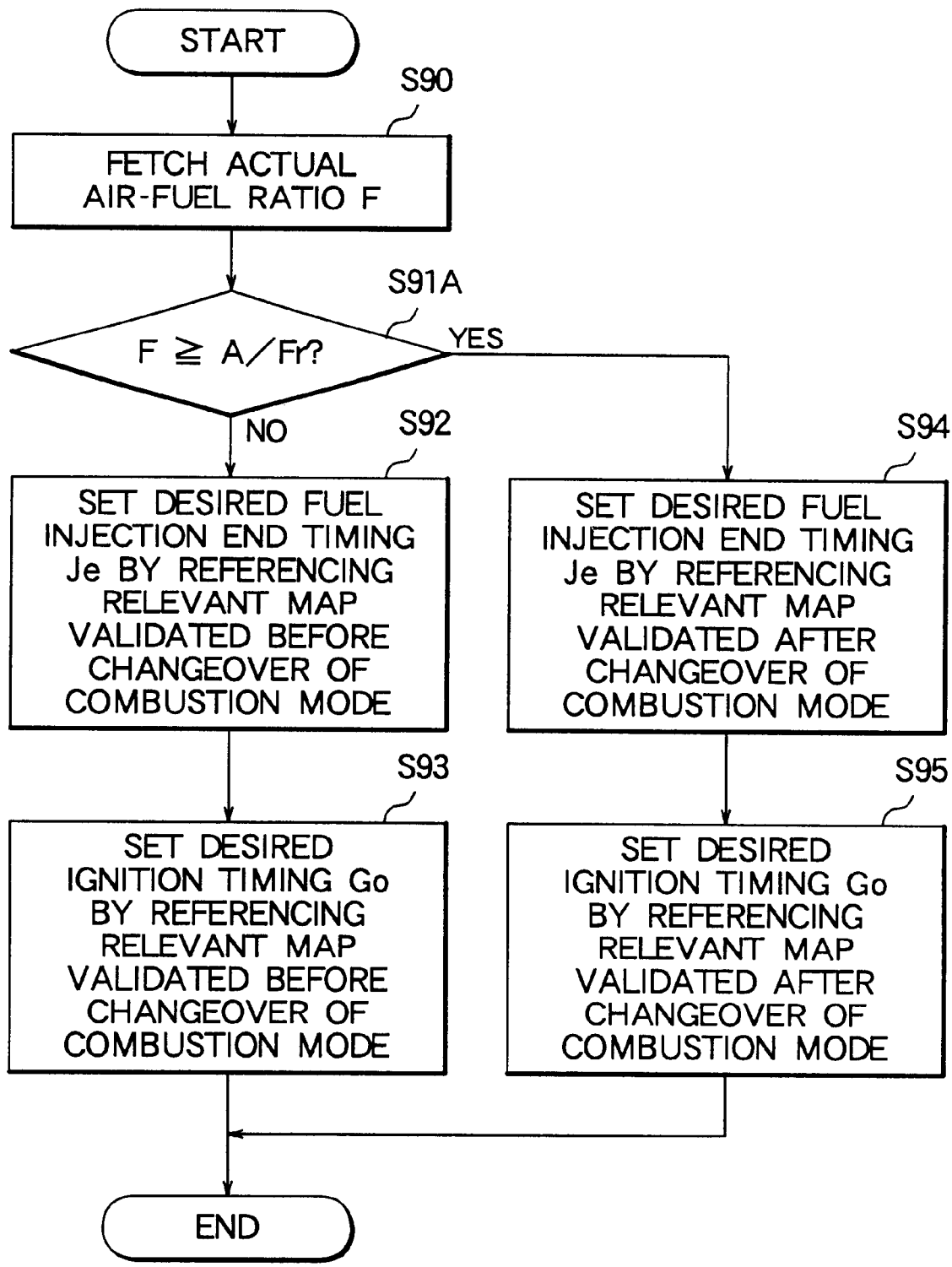
FIG. 15 is a flow chart for illustrating a data map changeover processing for a desired fuel injection end timing and a desired ignition timing upon changeover of the combustion mode in the control system according to a third embodiment of the present invention.

FIG. 15 is a flow chart for illustrating processing operation of the control system for the cylinder injection type engine for changing over the combustion mode according to a third embodiment of the invention, wherein the timing at which the control parameter value is to be changed upon changeover of the combustion mode is determined on the basis of the actual air-fuel ratio F of the exhaust gas detected actually. In FIG. 15, steps S92 to S95 are same as those described previously by reference to FIG. 13.

Referring to FIG. 15, the control parameter arithmetic means 52 fetches the actual air-fuel ratio F detected by the linear-type air-fuel ratio sensor 6 mounted within the exhaust pipe 1b upon the changeover of the combustion mode M (step S90) and then decides whether or not the actual air-fuel ratio F is not smaller than the predetermined air-fuel ratio A/Fr (step S91A).

When it is decided that the actual air-fuel ratio F is smaller than the predetermined air-fuel ratio A/Fr (i.e., when the decision in the step S91A results in negation "NO"), the processing proceeds to the steps S92 and S93 of setting the value of the control parameters on the basis of the maps which had been referenced before the current changeover of the combustion mode. By contrast, when it is decided that the actual air-fuel ratio F is not smaller than the predetermined air-fuel ratio A/Fr (i.e., when the decision in the step S91A results in affirmation "YES"), the processing proceeds to the steps S924 and S95 of setting the control parameters on the basis of the maps referenced upon changeover of the combustion mode, whereon the processing routine in FIG. 15 is terminated.

As will now be appreciated from the foregoing, in the case of the control system according to the instant embodiment of the invention, the desired air-fuel ratio filter 50 incorporated in the ECU 12A in the control systems described hereinbefore can be spared by virtue of such arrangement that the desired fuel injection end timing and the desired ignition timing are controlled or changed on the basis of the air-fuel ratio F actually detected within the exhaust pipe 1b, to an advantageous effect.

Embodiment 4

In the case of the control system for the cylinder injection type internal combustion engine according to the first embodiment of the invention, the desired fuel injection end timing Je and the desired ignition timing Go are arithmetically determined on the basis of the charging efficiency EC by referencing the data maps. However, the desired fuel injection end timing Je as well as the desired ignition timing Go may be arithmetically determined on the basis of the desired fuel injection quantity Jo by referencing the relevant map.

In the following, referring to FIGS. 16, 17 and 18, description will be directed to the control system for the cylinder injection type engine according to a fourth embodiment of the invention in which the combustion control parameters are arithmetically determined on the basis of the desired fuel injection quantity Jo by referencing the pertinent map.

Figure 16:
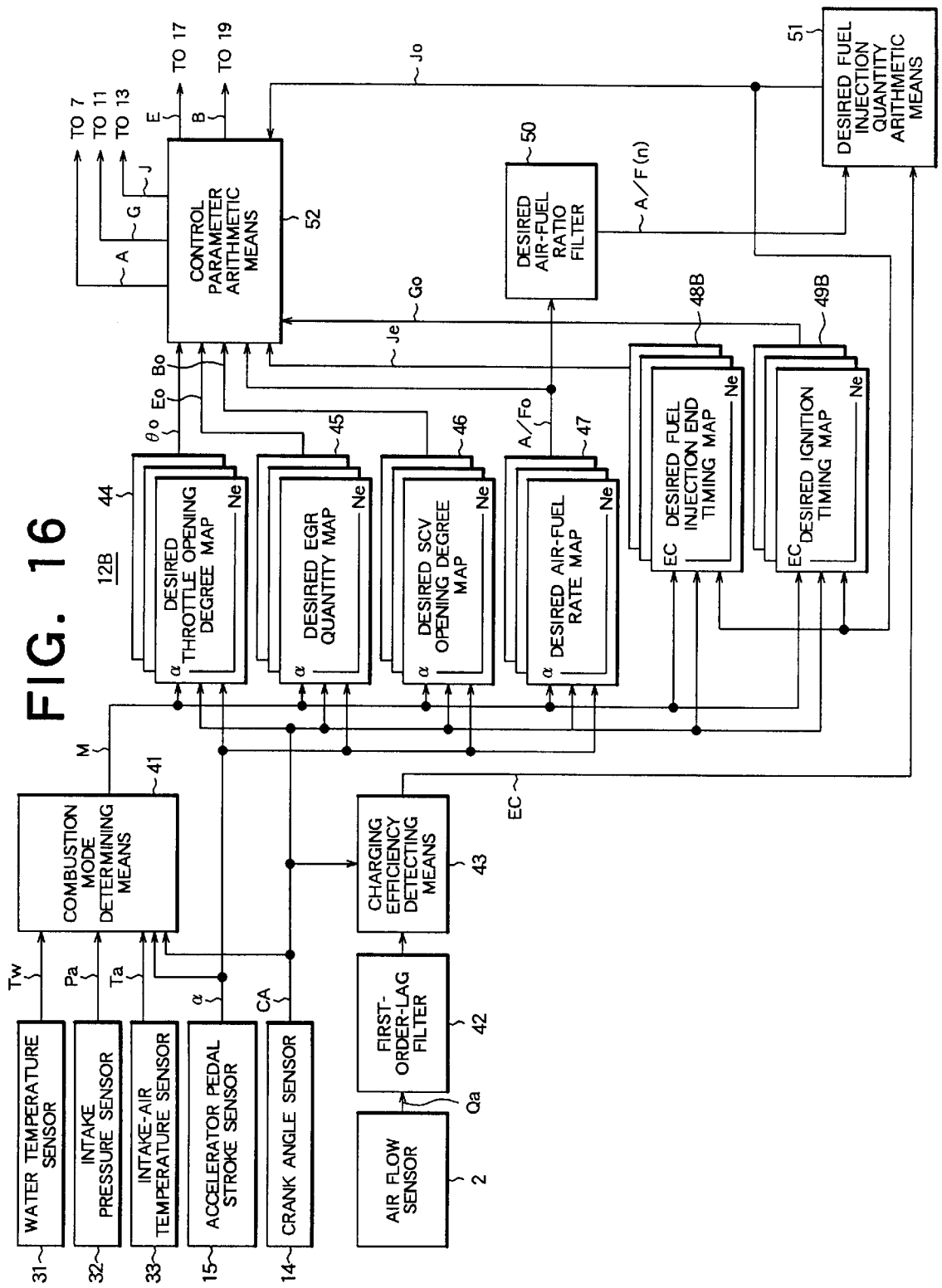
FIG. 16 is a functional block diagram showing a general arrangement of an electronic control unit which serves as a control means of the control system for a cylinder injection/ type engine according to a fourth embodiment of the present invention.

FIG. 16 is a functional block diagram showing a general arrangement of an ECU (control means) 12B in the control system according to the fourth embodiment of the invention. In the figure, like parts or components as those described hereinbefore by reference to FIG. 1 are denoted by like reference symbols, and repeated description thereof is omitted. Further, FIGS. 17 and 18 are flow charts for illustrating control parameter setting procedures or routines according to the fourth embodiment of the invention, wherein steps S71, S72B and S73 and steps S81, S82B and S83 corresponds to those designated by like reference symbols in FIGS. 9 and 10. The processing routines illustrated in FIGS. 16 to 18 differ from those described previously by reference to FIGS. 1, 9 and 10 only in the respects in setting the desired fuel injection end timing Je (FIG. 17) and the desired ignition timing Go (FIG. 18), as shown by affixing "B".

According to the teachings of the invention incarnated in the instant embodiment, the ECU 12B is so designed as to fetch the desired fuel injection quantity Jo outputted from the desired fuel injection quantity arithmetic means 51 to thereby set or determine the desired fuel injection end timing Je and the desired ignition timing Go on the basis of the desired fuel injection quantity Jo and the engine rotation number Ne by referencing a desired fuel injection end timing map 48B and a desired ignition timing map 49B stored in the ECU 12B.

Figure 17:
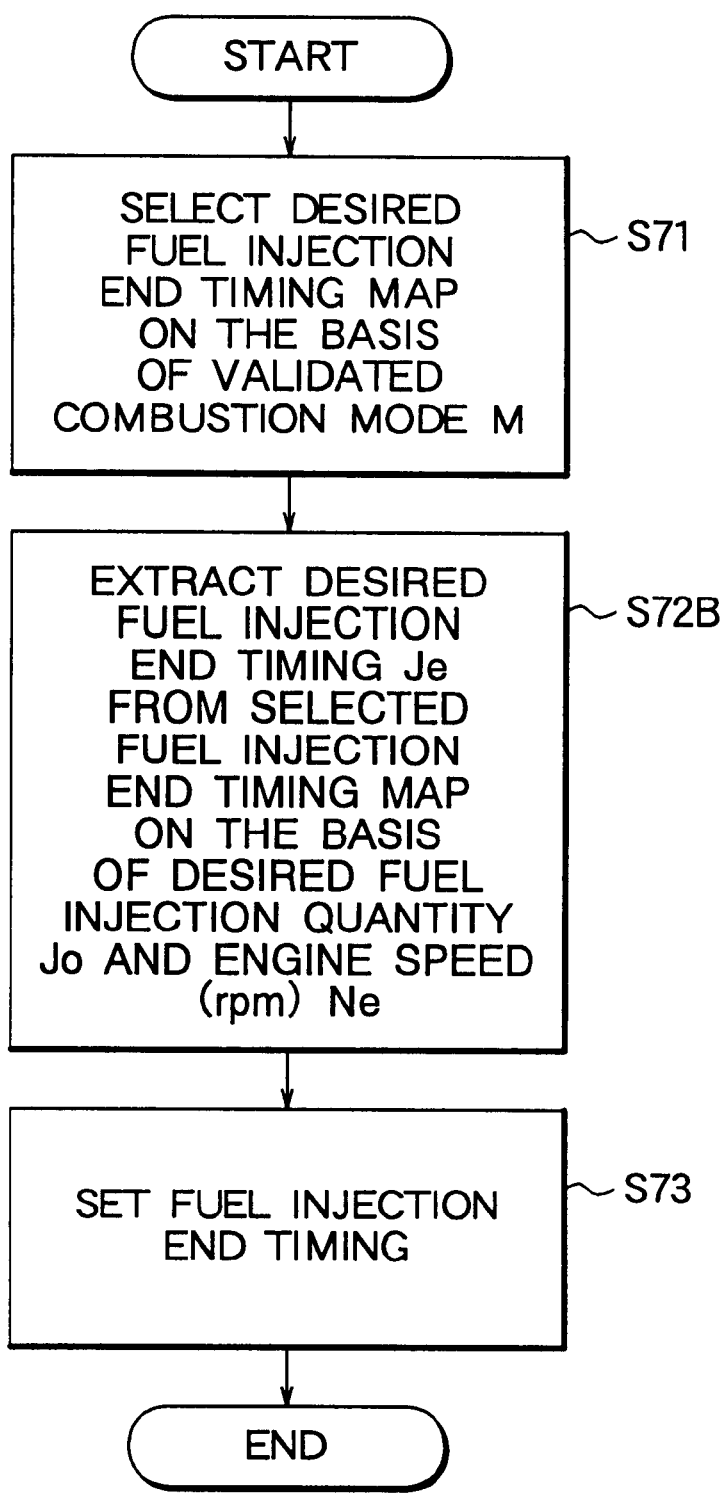
FIG. 17 is a flow chart for illustrating a processing procedure for determining and setting a desired fuel injection end timing in the control system according to the fourth embodiment of the invention.

More specifically, referring to FIG. 17, the control parameter arithmetic means 52 constituting a part of the control means 12B selects the desired fuel injection end timing map 48B in conformance with the currently validated combustion mode M (step S71) to thereby extract the desired fuel injection end timing Je from the selected map 48B on the basis of the desired fuel injection quantity Jo and the engine rotation number Ne (step S72B), to thereby set the fuel injection end timing (step S73).

Figure 18:
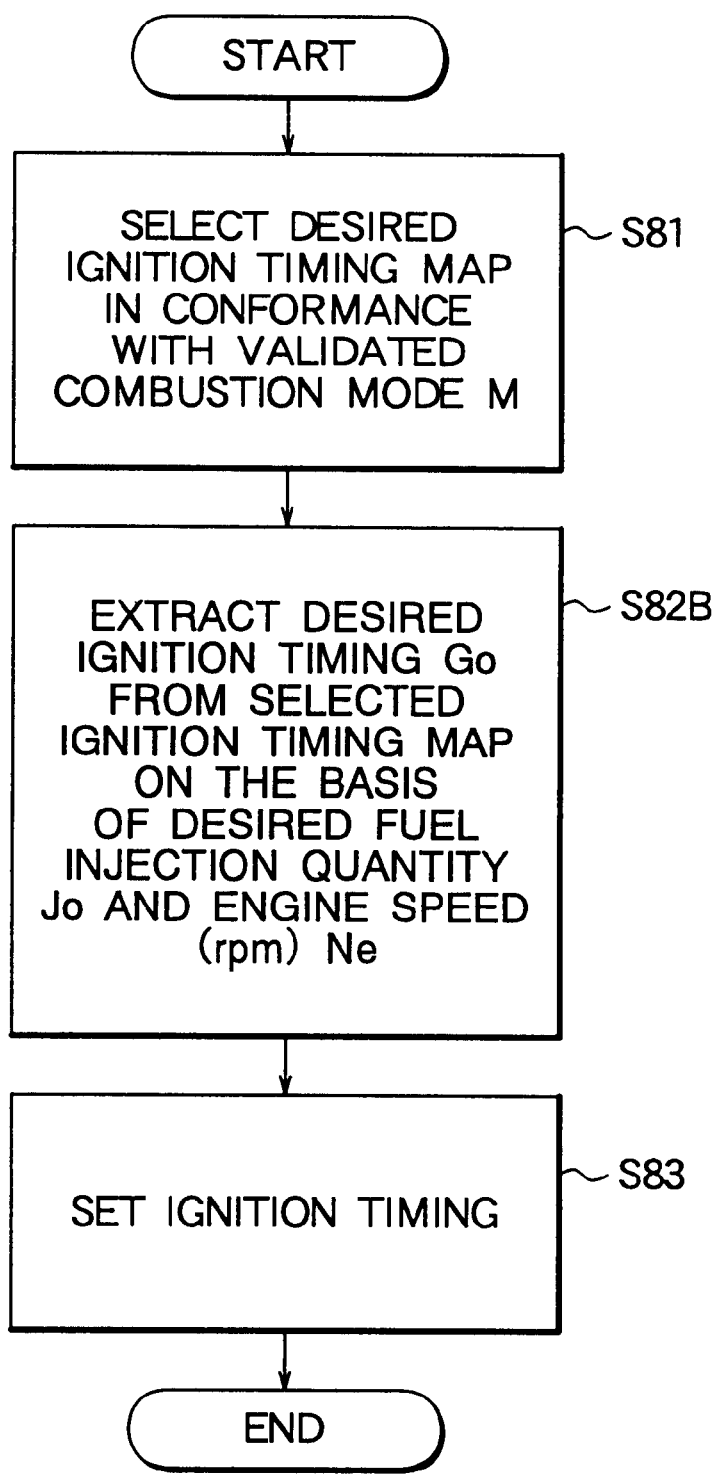
FIG. 18 is a flow chart for illustrating a desired ignition timing setting procedure in the control system according to the fourth embodiment of the invention.

Further, as can be seen in FIG. 18, the control parameter arithmetic means 52 selects the desired ignition timing map 49B conforming to the currently validated combustion mode M (step S81) to extract the desired ignition timing Go from the selected map on the basis of the desired fuel injection quantity Jo and the engine rotation number Ne (step S82B), to thereby set the effective ignition timing (step S83).

As is obvious from the above, effects similar to those described hereinbefore can be achieved with the control system according to the fourth embodiment of the invention. At this juncture, it should be added that the desired fuel injection quantity Jo in the steps S72B and S82B mentioned above is equivalent to the pulse width of the pulse signal applied to the fuel injector 13. Accordingly, the pulse width of the fuel injection signal J may be made use of as the desired fuel injection quantity Jo essentially to the same effect.

Embodiment 5

In the control system for the cylinder injection type engine according to the first embodiment of the present invention, the desired EGR valve opening degree Eo is arithmetically determined on the basis of the accelerator pedal depression stroke α by referencing the pertinent data map. However, the desired EGR valve opening degree Eo may be arithmetically determined on the basis of the charging efficiency EC which is equivalent to the actual intake air quantity Qa by referencing the relevant map.

Figure 19:
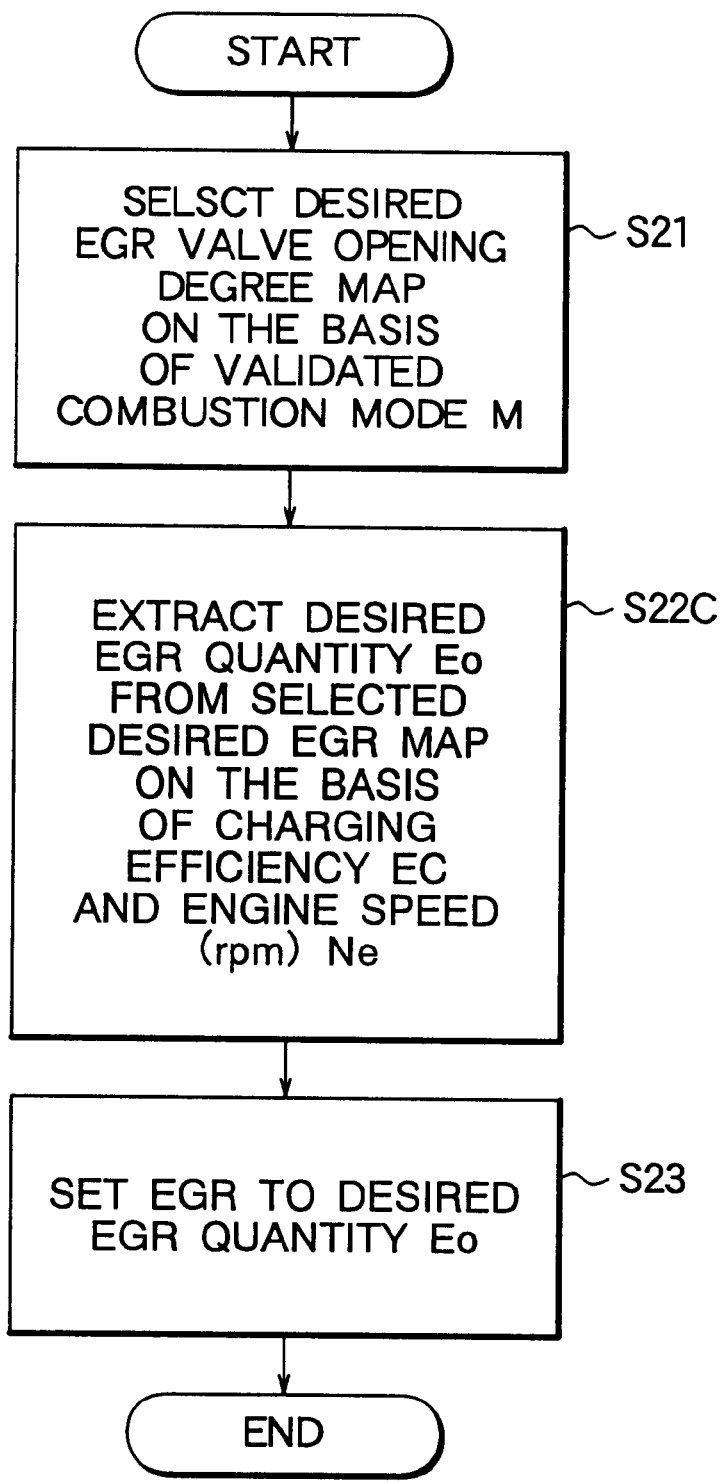
FIG. 19 is a flow chart for illustrating a desired EGR quantity setting procedure in the control system according to a fifth embodiment of the present invention.

In the following, referring to FIG. 19, description will be directed to the control system for the cylinder injection type engine according to a fifth embodiment of the invention in which the desired EGR valve opening degree Eo is arithmetically determined on the basis of the charging efficiency EC by referencing the relevant map. FIG. 19 is a flow chart for illustrating a processing for setting the desired EGR valve opening degree Eo according to the fifth embodiment of the invention, wherein steps S21, S22C and S23 correspond, respectively, to those designated by like reference symbols in FIG. 4. As can be seen in FIG. 19, the processing now under consideration differs from that described previously by reference to FIG. 4 only in the step S22C of setting the desired EGR valve opening degree Eo.

Referring to the figure, the control parameter arithmetic means 52 determines the desired EGR valve opening degree Eo on the basis of the charging efficiency EC and the engine rotation number Ne by referencing the map selected in conformance with the currently validated combustion mode M in the step S22C illustrated in FIG. 19.

As will be appreciated from the above, by controlling the EGR regulating valve 17 on the basis of the charging efficiency EC (the intake air quantity Qa) and the engine rotation number Ne, it is possible to control the EGR quantity optimally in dependence on the actual engine load, similarly to the control systems described hereinbefore. Besides, with the control system according to the fifth embodiment of the invention, the processing itself can be much simplified.

Embodiment 6

In the control system for the cylinder injection type engine according to the fifth embodiment of the invention, the desired EGR valve opening degree Eo is arithmetically determined on the basis of the charging efficiency EC by referencing the relevant map. However, the desired EGR valve opening degree Eo can also be arithmetically determined on the basis of the desired fuel injection quantity Jo by referencing the pertinent map.

Figure 20:
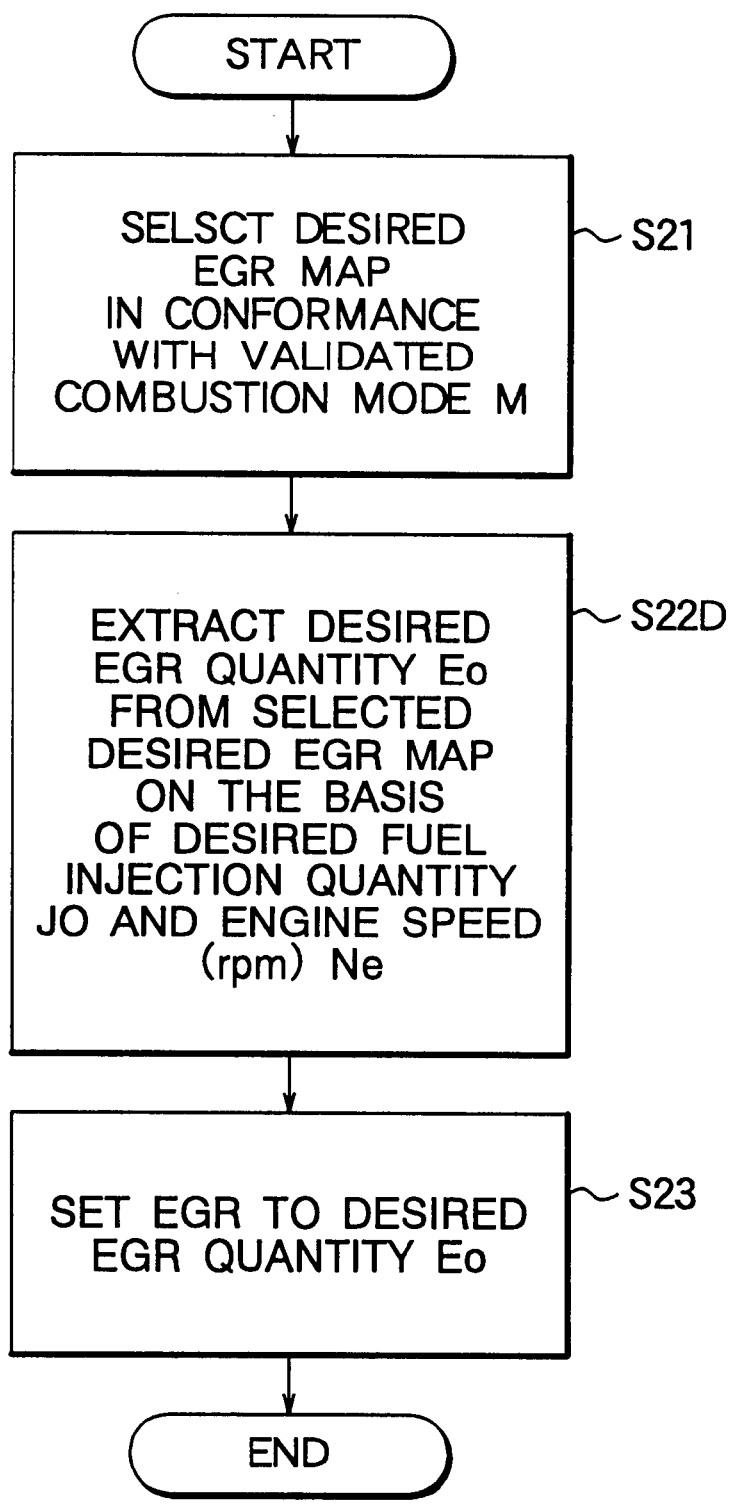
FIG. 20 is flow chart for illustrating a desired EGR quantity setting procedure in the control system according to a sixth embodiment of the present invention.

The following description made by referring to FIG. 20 is directed to a control system for the cylinder injection type engine according to a sixth embodiment of the invention in which the desired EGR valve opening degree Eo is arithmetically determined on the basis of the desired fuel injection quantity Jo by referencing the relevant map. FIG. 20 is a flow chart for illustrating a processing routine for setting the desired EGR valve opening degree Eo according to the sixth embodiment of the invention. As can be seen in FIG. 20, the processing routine now of concern differs from that described previously by reference to FIG. 19 only in the step S22D of setting the desired EGR mvalve opening degree Eo.

Now referring to FIG. 20, the control parameter arithmetic means 52 determines in the step S22D the desired EGR valve opening degree Eo on the basis of the desired fuel injection quantity Jo and the engine rotation number Ne by referencing the map selected in conformance with the currently validated combustion mode M.

By controlling the EGR regulating valve 17 (see FIG. 23) on the basis of the desired fuel injection quantity Jo and the engine rotation number Ne in this manner, advantageous effects similar to those mentioned hereinbefore can be achieved.

Embodiment 7

In the control system according to the first embodiment of the invention, the desired swirl valve (SCV) opening degree Bo is arithmetically determined on the basis of the accelerator pedal depression stroke α by referencing the relevant data map. However, the desired swirl valve opening degree Bo can be arithmetically determined on the basis of the charging efficiency EC (intake air quantity Qa) by referencing the pertinent data map.

Figure 21:
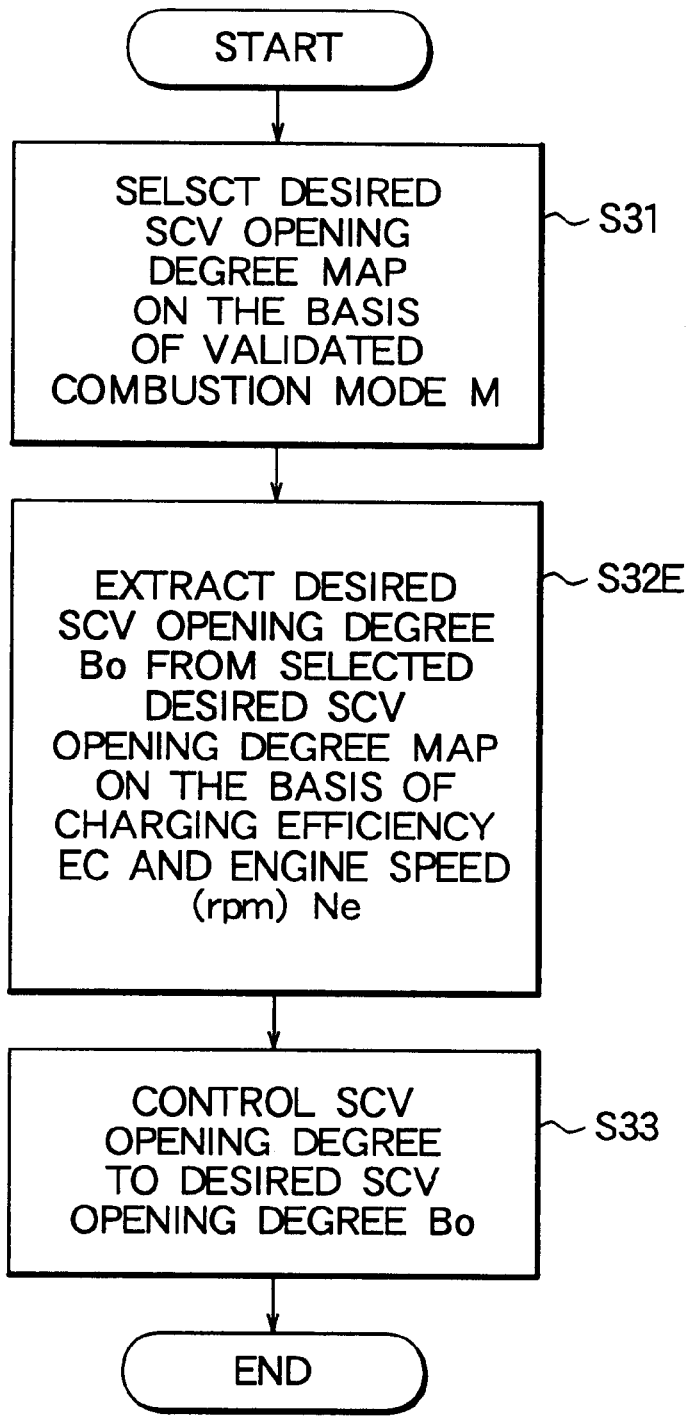
FIG. 21 is a flow chart for illustrating a desired swirl valve opening degree setting procedure in the control system according to a seventh embodiment of the present invention.

FIG. 21 is a flow chart for illustrating a processing for setting the desired swirl valve opening degree LAS Bo according to a seventh embodiment of the present invention, in which the desired swirl valve (SCV) opening degree Bo is arithmetically determined on the basis of the charging efficiency EC through map reference. In FIG. 21, steps S31, S32E and S33 correspond, respectively, to those designated by like reference symbols in FIG. 5. In FIG. 21, the processing routine now of concern differs from that described previously by reference to FIG. 5 only in the step S32E of setting the desired swirl valve (SCV) opening degree Bo.

Referring to the figure, the control parameter arithmetic means 52 determines the desired swirl valve (SCV) opening degree Bo on the basis of the charging efficiency EC and the engine rotation number Ne by referencing the map selected in conformance with the currently validated combustion mode M in the step S32E illustrated in FIG. 21.

As can be appreciated from the above, by controlling the swirl control valve 18 (see FIG. 23) on the basis of the charging efficiency EC (intake air quantity Qa) and the engine rotation number Ne, it is possible to control the swirl rate optimally and with high accuracy in consideration of the actual engine load. Thus, advantageous effects similar to those mentioned hereinbefore can be achieved.

Embodiment 8

In the control system according to the seventh embodiment of the invention, the desired swirl valve (SCV) opening degree Bo is arithmetically determined on the basis of the charging efficiency EC by referencing the relevant data map. However, the desired swirl valve opening degree Bo can equally be arithmetically determined on the basis of the desired fuel injection quantity Jo through the map reference.

Figure 22:
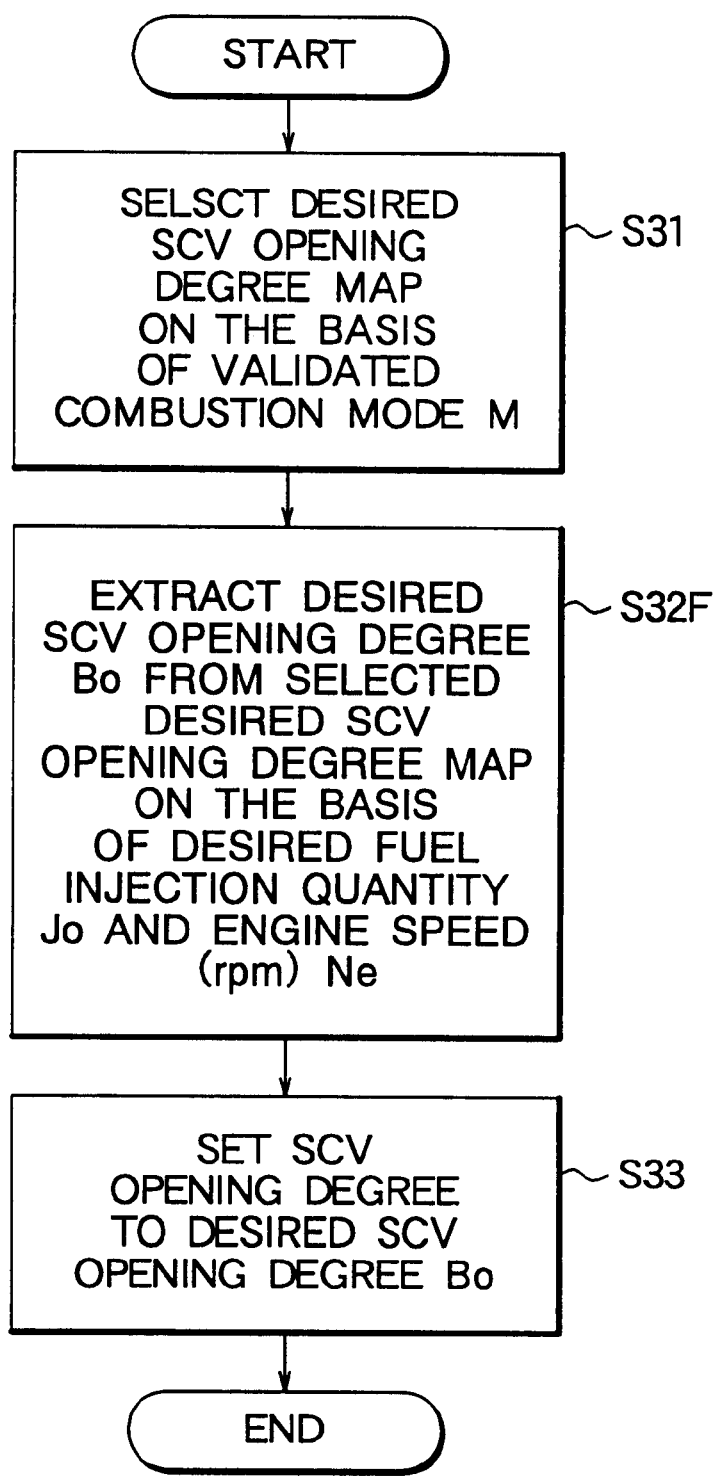
FIG. 22 is a flow chart for illustrating a desired swirl valve opening degree setting procedure in the control system according to an eighth embodiment of the present invention.

FIG. 22 is a flow chart for illustrating a processing routine for setting or determining the desired swirl valve (SCV) opening degree Bo according to an eighth embodiment of the present invention, in which the desired swirl valve opening degree Bo is arithmetically determined on the basis of the desired fuel injection quantity Jo by referencing the relevant map. As can be seen in FIG. 22, the processing routine now of concern differs from that described previously by reference to FIG. 21 only in a step S32F of setting the desired swirl valve opening degree Bo.

Now referring to FIG. 22, the control parameter arithmetic means 52 determines in the step S32F the desired swirl valve (SCV) opening degree Bo on the basis of the desired fuel injection quantity Jo and the engine rotation number Ne by referencing the map selected in conformance with the currently selected or validated combustion mode M.

By controlling the swirl control valve 18 (see FIG. 23) on the basis of the desired fuel injection quantity Jo and the engine rotation number Ne in this manner, advantageous effects similar to those mentioned hereinbefore can be achieved.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

Accordingly, all suitable modifications and equivalents may be resorted to, falling within the spirit and scope of the invention.

What is claimed is:

1. A control system for an internal combustion engine of a cylinder injection type, comprising:

fuel injection valves for injecting fuel directly into cylinders, respectively, of said internal combustion engine;

ignition means for igniting fuel within said cylinders, respectively, intake air flow regulating means for regulating quantity of intake air fed to said internal combustion engine;

sensors of various types for detecting operation states of said internal combustion engine; and control means for controlling said fuel injection valves, said ignition means and said intake air flow regulating means in dependence on said engine operation states, wherein said various types of sensors are designed to detect at least an engine rotation number, an accelerator pedal depression stroke and the intake air quantity, wherein said control means comprising:

combustion mode determining means for determining selectively at least five combustion modes in dependence on said engine rotation number and said accelerator pedal depression stroke;

desired air-fuel ratio setting means for setting a desired air-fuel ratio in conformance with said combustion mode on the basis of said engine rotation number and said accelerator pedal depression stroke;

desired fuel injection quantity arithmetic means for arithmetically determining a desired fuel injection quantity conforming to said desired air-fuel ratio; and control parameter arithmetic means for arithmetically determining control parameters for said fuel injection valves and said ignition means in conformance with said combustion mode on the basis of said engine rotation number and at least one of said accelerator pedal depression stroke, said intake air quantity and said desired fuel injection quantity.

2. A control system for a cylinder injection type internal combustion engine according to claim 1, wherein said control parameter arithmetic means arithmetically determines as a control parameter for said fuel injection valve a fuel injection end timing for terminating operation of said fuel injection valve.

3. A control system for a cylinder injection type internal combustion engine according to claim 1, said various types of sensors including:

sensors for detecting a cooling water temperature, an atmospheric pressure and an intake air temperature, respectively, of said engine, wherein said combustion mode determining means determines said combustion mode on the basis of at least one of said cooling water temperature, said atmospheric pressure and said intake air temperature in addition to said engine rotation number and said accelerator pedal depression stroke.

4. A control system for a cylinder injection type internal combustion engine according to claim 3, wherein said combustion mode determining means is so designed as to set said combustion mode to a stoichiometric feedback combustion mode or alternatively to an open loop mode in response to at least one of events that said cooling water temperature indicates a cold state of said engine, said atmospheric pressure indicates an ambiance in a highland area and that said intake air temperature indicates a cold district.

5. A control system for a cylinder injection type internal combustion engine according to claim 1, wherein said control means delays changeover control of the control parameters for at least one of said fuel injection valve and said ignition means until the air-fuel ratio has reached a predetermined air-fuel ratio upon changeover of said combustion mode.

6. A control system for a cylinder injection type internal combustion engine according to claim 5, said various types of sensors including:

a sensor for detecting an air-fuel ratio within an exhaust pipe of said internal combustion engine, wherein said control means is so designed as to employ as said air-fuel ratio for said engine the air-fuel ratio actually detected within said exhaust pipe.

7. A control system for a cylinder injection type internal combustion engine according to claim 1, further comprising:

exhaust gas recirculation regulating means for regulating an exhaust gas recirculation quantity representative of a part of exhaust gas of said engine which is recirculated, wherein said control parameter arithmetic means of said control means arithmetically determines a control parameter for said exhaust gas recirculation regulating means in conformance with said combustion mode on the basis of said engine rotation number and at least one of said accelerator pedal depression stroke, said intake air quantity and said desired fuel injection quantity, to thereby control said exhaust gas recirculation quantity.

8. The control system for an internal combustion engine of a cylinder injection type according to claim 1, further comprising:

a throttle opening degree setting means wherein the control parameter arithmetic means selects a data map from a desired throttle opening degree map set which is based on said engine rotation number and accelerator pedal depression stroke.

9. The control system for an internal combustion engine of a cylinder injection type according to claim 1, wherein said combustion modes comprise one of a stratified lean combustion mode, a uniform lean combustion mode, a stoichometric feedback combustion mode, an open loop control combustion mode and a fuel cut-off mode.

10. A control system for an internal combustion engine of a cylinder injection type, comprising:

fuel injection valves for injecting fuel directly into cylinders, respectively, of said internal combustion engine;

ignition means for igniting fuel within said cylinders, respectively, intake air flow regulating means for regulating quantity of intake air fed to said internal combustion engine;

sensors of various types for detecting operation states of said internal combustion engine; and control means for controlling said fuel injection valves, said ignition means and said intake air flow regulating means in dependence on said engine operation states, wherein said various types of sensors are designed to detect at least an engine rotation number, an accelerator pedal depression stroke and the intake air quantity, wherein said control means comprising:

combustion mode determining means for determining selectively a plurality of combustion modes in dependence on said engine rotation number and said accelerator pedal depression stroke;

desired air-fuel ratio setting means for setting a desired air-fuel ratio in conformance with said combustion mode on the basis of said engine rotation number and said accelerator pedal depression stroke;

wherein said desired air-fuel ratio setting means includes:

filter means for performing a filter processing on said desired air-fuel ratio so that said desired air-fuel ratio can follow change behavior of said intake air quantity;

desired fuel injection quantity arithmetic means for arithmetically determining a desired fuel injection quantity conforming to said desired air-fuel ratio; and control parameter arithmetic means for arithmetically determining control parameters for said fuel injection valves and said ignition means in conformance with said combustion mode on the basis of said engine rotation number and at least one of said accelerator pedal depression stroke said intake air quantity and said desired fuel injection quantity.

11. A control system for an internal combustion engine of a cylinder injection type, comprising:

fuel injection valves for injecting fuel directly into cylinders, respectively, of said internal combustion engine;

ignition means for igniting fuel within said cylinders, respectively, intake air flow regulating means for regulating quantity of intake air fed to said internal combustion engine;

sensors of various types for detecting operation states of said internal combustion engine; and control means for controlling said fuel injection valves said ignition means and said intake air flow regulating means in dependence on said engine operation states, wherein said various types of sensors are designed to detect at least an engine rotation number, an accelerator pedal depression stroke and the intake air quantity, wherein said control means comprising:

combustion mode determining means for determining selectively a plurality of combustion modes in dependence on said engine rotation number and said accelerator pedal depression stroke;

desired air-fuel ratio setting means for setting a desired air-fuel ratio in conformance with said combustion mode on the basis of said engine rotation number and said accelerator pedal depression stroke;

wherein said desired air-fuel ratio setting means includes filter means for performing a filter processing on said desired air-fuel ratio so that said desired air-fuel ratio can follow change behavior of said intake air quantity, and wherein said control means is so designed as to employ as said air-fuel ratio a desired filtering-undergone air-fuel ratio which has undergone the filtering processing through said filter means which constitutes a part of said desired air-fuel setting means, and said control means delays changeover control of the control parameters for at least one of said fuel injection valve and said ignition means until the air-fuel ratio has reached a predetermined air-fuel ratio upon changeover of said combustion mode;

desired fuel injection quantity arithmetic means for arithmetically determining a desired fuel injection quantity conforming to said desired air-fuel ratio; and control parameter arithmetic means for arithmetically determining control parameters for said fuel injection valves and said ignition means in conformance with said combustion mode on the basis of said engine rotation number and at least one of said accelerator pedal depression stroke, said intake air quantity and said desired fuel injection quantity.

12. A control system for an internal combustion engine of a cylinder injection type, comprising:

fuel injection valves for injecting fuel directly into cylinders, respectively, of said internal combustion engine;

ignition means for igniting fuel within said cylinders, respectively, intake air flow regulating means for regulating quantity of intake air fed to said internal combustion engine;

sensors of various types for detecting operation states of said internal combustion engine; and control means for controlling said fuel injection valves, said ignition means and said intake air flow regulating means in dependence on said engine operation states, wherein said various types of sensors are designed to detect at least an engine rotation number, an accelerator pedal depression stroke and the intake air quantity, wherein said control means comprising:

combustion mode determining means for determining selectively a plurality of combustion modes in dependence on said engine rotation number and said accelerator pedal depression stroke;

desired air-fuel ratio setting means for setting a desired air-fuel ratio in conformance with said combustion mode on the basis of said engine rotation number and said accelerator pedal depression stroke;

desired fuel injection quantity arithmetic means for arithmetically determining a desired fuel injection quantity conforming to said desired air-fuel ratio;

control parameter arithmetic means for arithmetically determining control parameters for said fuel injection valves and said ignition means in conformance with said combustion mode on the basis of said engine rotation number and at least one of said accelerator pedal depression stroke, said intake air quantity and said desired fuel injection quantity; and swirl valves for generating swirls within said cylinders, respectively; and swirl rate regulating means for driving said swirl means to thereby regulate swirl rate within said cylinder, wherein said control parameter arithmetic means arithmetically determines a control parameter for said swirl rate regulating means in conformance with said combustion mode on the basis of said engine rotation number and at least one of said accelerator pedal depression stroke, said intake air quantity and said desired fuel injection quantity, for thereby controlling said swirl rate.

* * * * *